(12) United States Patent
Rath et al.

(10) Patent No.: US 11,463,525 B1
(45) Date of Patent: Oct. 4, 2022

(54) METHOD AND SYSTEM FOR MANAGING INTERNET OF THINGS (IOT) DEVICES IN HETEROGENEOUS COMMUNICATION NETWORKS

(71) Applicant: Wipro Limited, Bangalore (IN)

(72) Inventors: Anupam Kumar Rath, Bangalore (IN); Debasish Chanda, Maheshtala (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 17/457,707

(22) Filed: Dec. 6, 2021

(30) Foreign Application Priority Data

Oct. 8, 2021 (IN) .............................. 202141045853

(51) Int. Cl.
| | | |
|---|---|---|
| H04L 12/28 | (2006.01) | |
| H04L 67/12 | (2022.01) | |
| G16Y 40/30 | (2020.01) | |
| H04L 41/0853 | (2022.01) | |
| H04L 41/22 | (2022.01) | |
| G16Y 20/20 | (2020.01) | |

(52) U.S. Cl.
CPC .............. *H04L 67/12* (2013.01); *G16Y 20/20* (2020.01); *G16Y 40/30* (2020.01); *H04L 41/0853* (2013.01); *H04L 41/22* (2013.01)

(58) Field of Classification Search
CPC ..... H04L 67/12; H04L 41/0853; H04L 41/22; G16Y 20/20; G16Y 40/30
See application file for complete search history.

(56) References Cited

U.S. PATENT DOCUMENTS

| | | |
|---|---|---|
| 8,552,843 B2 | 10/2013 | Dizechi et al. |
| 9,306,763 B2 | 4/2016 | Tatzel et al. |
| 9,876,652 B2 | 1/2018 | Tatzel et al. |
| 2013/0038800 A1 | 2/2013 | Yoo |
| 2014/0098247 A1 | 4/2014 | Rao et al. |
| 2015/0095161 A1 | 4/2015 | Goel |
| 2018/0219920 A1* | 8/2018 | Patel ....................... H04L 63/10 |
| 2020/0228497 A1* | 7/2020 | Banerjee ............. H04L 63/0876 |

OTHER PUBLICATIONS

Jadhav, Amul, et al., "Universal Mobile Application Development (UMAD) On Home Automation", Network and Complex Systems, IISTE, ISSN 2224-610X (Paper) ISSN 2225-0603 (Online), vol. 2, No. 2, 2012, www.iiste.org, 9 pages.

* cited by examiner

*Primary Examiner* — Kim T Nguyen
(74) *Attorney, Agent, or Firm* — Finnegan, Henderson, Farabow, Garrett & Dunner, LLP

(57) ABSTRACT

This disclosure relates to method and system for managing Internet of Things (IoT) devices in heterogeneous communication networks. The method includes receiving metadata corresponding to each of a set of IoT devices including a plurality of IoT sensors; validating each of the set of IoT devices based on the received metadata; establishing communication with each of the set of IoT devices through an associated predefined data communication protocol; receiving real-time data from each of the plurality of sensors associated with each of the set of IoT devices through an IoT protocol; monitoring the real-time data received from each of the plurality of sensors at predefined time intervals through a Graphical User Interface (GUI); and managing one or more device parameters corresponding to each of the set of IoT devices in the heterogeneous communication network through the GUI based on the real-time data.

20 Claims, 16 Drawing Sheets

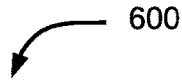

| Configuration Parameters 602 | Description 604 |
|---|---|
| Device ID 606 | Unique ID used as key to identify a device |
| Device Name 608 | Name of the device used to notify end user for any critical message |
| Device Manufacturer 610 | OEM details for the device for any OME related business rule development |
| Device Sensor[] 612 | A device can have multiple Sensor (array of sensors) |
| Sensor ID 614 | Unique ID used as key to identify a Sensor |
| Sensor Type 616 | Description of sensor |
| Sensor Name 618 | Name of the Sensor |
| ON() 620 | Method to start the sensor |
| Off() 622 | Method to stop the sensor |
| CallBack () 624 | Callback method for read sensor value |
| Connectivity type 626 | Type of connectivity between mobile app and IOT device |
| Connectivity protocol 628 | Protocol used for data communication between mobile app and device |
| Connectivity data rate 630 | Maximum data rate |
| Connectivity security 632 | Security parameters used by OEM |
| Server URL 634 | URL for the IOT device will send the device data |
| Server type 636 | Connection type between mobile app and IOT server |
| Server ip 638 | IP address of IOT server |
| Server port 640 | Port of IOT server to send the data. |

FIG. 6

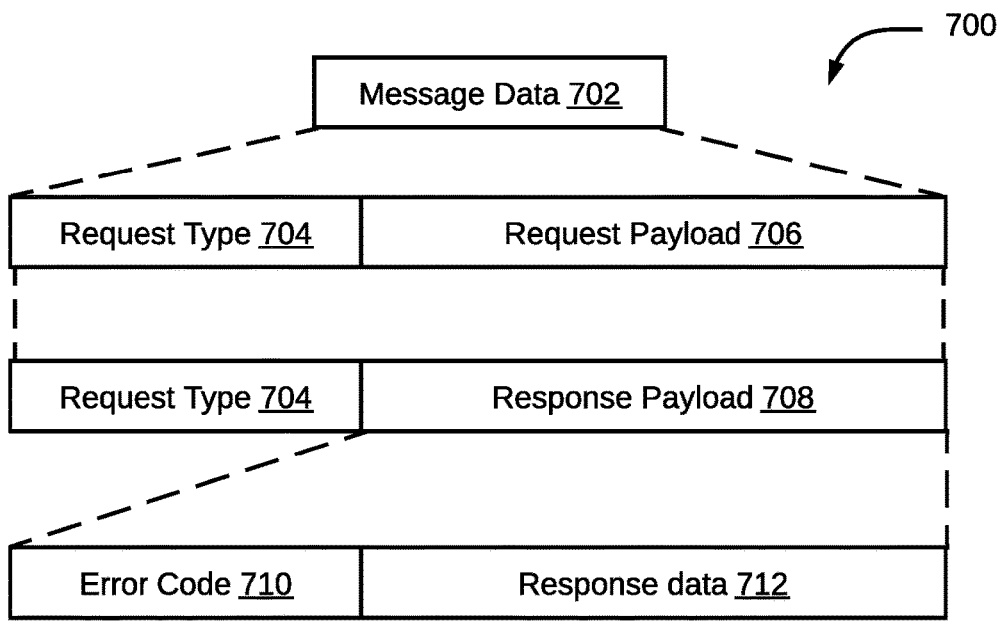

FIG. 7

| Request Type 802 | Description 804 |
|---|---|
| ATTACH_DEVICE 806 | Request from Mobile app to device to Register in Universal platform |
| DETACH_DEVICE 808 | Request from Mobile app to device to De-Register in Universal platform |
| AUTH_TOKEN 810 | Create and share unique token (Device identifier), which will be used for subsequent communications |
| DEVICE_QUERY 812 | Query IOT device for a list of Sensors available on the device |
| DEVICE_COMMAND 814 | Request Device to provide a list of methods / KPIs for a Sensor. |
| DEVICE_NOTIFICATION 816 | Request call back details for sensors data. |
| NEW_SENSOR_REQUEST 818 | Request device to provide the current sensors data |
| SENSOR_REQUEST_CANCELLATION 820 | Cancel a request unilaterally – either by user, or mobile or in emergency |
| REQUEST_MOBILE_ACK 822 | Mobile sends this request after the request is delivered seeking confirmation and feedback from the Device |
| RECORD_DEVICE_ACK 824 | Record the acknowledge for a delivered request |
| REGISTER_FOR_NOTIFICATION 826 | Request device to send notifications to mobile app. |
| UNREGISTER_FOR_NOTIFICATION 828 | Request device to stop sending notifications to mobile app. |

FIG. 8

| Error Code 902 | Description 904 |
|---|---|
| NO_ERROR 906 | The request was successfully processed by the recipient |
| INVALID_TOKEN 908 | The request did not contain a valid token (device identifier) |
| UNAUTHORIZED 910 | The requested operation was disallowed |
| SYSTEM_FAILURE 912 | There is some device failure due to which request could not be processed |
| QUERY_FAILED 914 | Indicates that requested query could not be resolved |
| INVALID_METHOD 916 | Indicates that sensor do not have requested method |
| DEVICE_BUSY 918 | Indicates that sensor is busy and try after some time. |
| INTERVAL_REJECTED 920 | Indicates interval proposed for data retrieval between mobile and device is rejected. |
| INVALID_REQUEST 922 | The request was disallowed because it was improperly formatted |
| UNEXPECTED_REQUEST 924 | The request was disallowed because it was sent out of context e.g., cancelling an request which was never placed |

FIG. 9

METHOD AND SYSTEM FOR MANAGING INTERNET OF THINGS (IOT) DEVICES IN HETEROGENEOUS COMMUNICATION NETWORKS

TECHNICAL FIELD

This disclosure relates generally to Internet of Things (IoT) network, and more particularly, to the method and system for managing IoT devices in heterogeneous communication networks.

BACKGROUND

Today, mobile phones and smartphones are default modes of communication for each industry sector and are a key part of digital transformation for various users (B2B, B2C, or B2E). Mobile enablement (managing and controlling) for Internet of Things (IoT)-based sensors and devices is growing rapidly. In the present state of art, Original Equipment Manufacturers (OEMs) develop individual mobile applications to control self-manufactured devices which leads to a limitation for an OEM as well as for end user experience. For example, a home user may have 'n' number of appliances (such as, lights, fans, thermostat, cooking ware, washing machine, etc.) from various OEMs. In such cases, a user must have 'n' number of different mobile applications for an almost similar job. The conventional methods lack a mechanism for OEMs to comply with a single mobile application to launch a new product (IoT sensors or devices).

Conventionally, mobile OEMs use mobile as an IoT device with multiple embedded sensors such as, a health tracker, a thermometer, weather monitor, etc. Some conventional techniques make use of mobile as an IoT gateway for critical data processing and better user experience. However, user experience to control and monitor day-to-day use of IoT sensors is still a concern.

In the present state of art, voice-guided technologies like Alexa®, Google® Home, etc. enable a user to use home IoT devices. However, there is no framework to meet a single master/Universal application experience for device OEMs to comply for better user experience. Therefore, there is a need in the present state-of-the-art for a mechanism to sync multiple IoT devices in a heterogeneous network with a single user experience.

SUMMARY

In one embodiment, a method for managing Internet of Things (IoT) devices in heterogeneous communication networks is disclosed. In one example, the method may include receiving metadata corresponding to each of a set of IoT devices. A plurality of IoT sensors is associated with each of the set of IoT devices. The metadata includes configuration parameters corresponding to each of the plurality of IoT sensors. The method may further include validating each of the set of IoT devices based on the received metadata. Upon successfully validating, the method may further include establishing communication with each of the set of IoT devices through an associated predefined data communication protocol. The set of IoT devices is a part of a heterogeneous communication network. The method may further include receiving real-time data from each of the plurality of sensors associated with each of the set of IoT devices through an IoT protocol. The IoT protocol is a Lightweight Device Control Protocol (LWDCP). The method may further include monitoring the real-time data received from each of the plurality of sensors at predefined time intervals through a Graphical User Interface (GUI). The method may further include managing one or more device parameters corresponding to each of the set of IoT devices in the heterogeneous communication network through the GUI based interface on the real-time data. The one or more device parameters include device properties, device configuration, device access controls, and the configuration parameters corresponding to each of the plurality of IoT sensors.

In one embodiment, a system for managing IoT devices in heterogeneous communication networks is disclosed. In one example, the system may include a processor and a computer-readable medium communicatively coupled to the processor. The computer-readable medium may store processor-executable instructions, which, on execution, may cause the processor to receive metadata corresponding to each of a set of IoT devices. A plurality of IoT sensors is associated with each of the set of IoT devices. The metadata includes configuration parameters corresponding to each of the plurality of IoT sensors. The processor-executable instructions, on execution, may further cause the processor to validate each of the set of IoT devices based on the received metadata. Upon successfully validating, the processor-executable instructions, on execution, may further cause the processor to establish communication with each of the set of IoT devices through an associated predefined data communication protocol. The set of IoT devices is a part of a heterogeneous communication network. The processor-executable instructions, on execution, may further cause the processor to receive real-time data from each of the plurality of sensors associated with each of the set of IoT devices through an IoT protocol. The IoT protocol is an LWDCP. The processor-executable instructions, on execution, may further cause the processor to monitor the real-time data received from each of the plurality of sensors at predefined time intervals through a GUI. The processor-executable instructions, on execution, may further cause the processor to manage one or more device parameters corresponding to each of the set of IoT devices in the heterogeneous communication network through the GUI based on the real-time data. The one or more device parameters include device properties, device configuration, device access controls, and the configuration parameters corresponding to each of the plurality of IoT sensors.

In one embodiment, a non-transitory computer-readable medium storing computer-executable instructions for managing IoT devices in heterogeneous communication networks is disclosed. In one example, the stored instructions, when executed by a processor, may cause the processor to perform operations including receiving metadata corresponding to each of a set of IoT devices. A plurality of IoT sensors is associated with each of the set of IoT devices. The metadata includes configuration parameters corresponding to each of the plurality of IoT sensors. The operations may further include validating each of the set of IoT devices based on the received metadata. Upon successfully validating, the operations may further include establishing communication with each of the set of IoT devices through an associated predefined data communication protocol. The set of IoT devices is a part of a heterogeneous communication network. The operations may further include receiving real-time data from each of the plurality of sensors associated with each of the set of IoT devices through an IoT protocol. The IoT protocol is an LWDCP. The operations may further include monitoring the real-time data received from each of the plurality of sensors at predefined time intervals through a GUI. The operations may further include managing one or more device parameters corresponding to each of the set of IoT devices in the heterogeneous communication network through the GUI based on the real-time data. The one or more device parameters include device properties, device configuration, device access controls, and the configuration parameters corresponding to each of the plurality of IoT sensors.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 6 is an exemplary table showing configuration parameters and a description corresponding to each of the configuration parameters, in accordance with some embodiments.

FIG. 7 illustrates an exemplary structure of message data of response/request messages between a smartphone and an IoT device, in accordance with some embodiments.

FIG. 8 is an exemplary table showing request type and a description corresponding to the request type, in accordance with some embodiments.

FIG. 9 is an exemplary table showing an error code and a description corresponding to the error code, in accordance with some embodiments.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
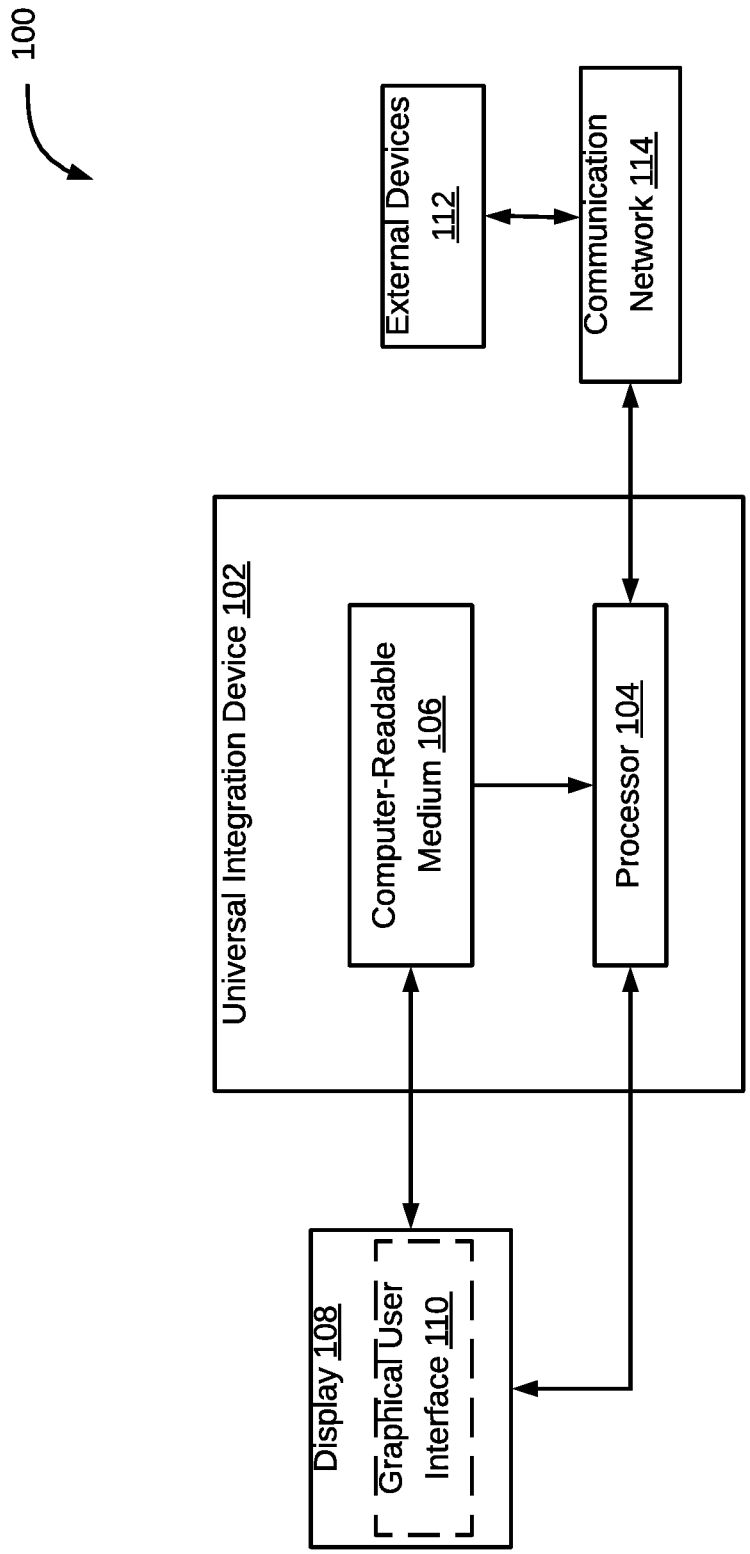
FIG. 1 is a block diagram of an exemplary system for managing Internet of Things (IoT) devices in heterogeneous communication networks, in accordance with some embodiments.

Referring now to FIG. 1, an exemplary system 100 for managing Internet of Things (IoT) devices in heterogeneous communication networks is illustrated, in accordance with some embodiments. In particular, the system 100 may include a universal integration device 102 (for example, server, desktop, laptop, notebook, netbook, tablet, smartphone, mobile phone, or any other computing device) that may manage IoT devices in heterogeneous communication networks. It should be noted that, in some embodiments, the universal integration device 102 may establish communication with each of a set of IoT devices through an associated predefined data communication protocol. The universal integration device 102 may further monitor the real-time data received from each of a plurality of sensors associated with each of the set of IoT devices at predefined time intervals and manage one or more device parameters corresponding to each of the set of IoT devices in the heterogeneous communication network based on the real-time data.

As will be described in greater detail in conjunction with FIGS. 2-15, the universal integration device 102 may receiving metadata corresponding to each of a set of IoT devices. A plurality of IoT sensors is associated with each of the set of IoT devices. The metadata includes configuration parameters corresponding to each of the plurality of IoT sensors. The universal integration device 102 may further validate each of the set of IoT devices based on the received metadata. Upon successfully validating, the universal integration device 102 may further establish communication with each of the set of IoT devices through an associated predefined data communication protocol. The set of IoT devices is a part of a heterogeneous communication network. The universal integration device 102 may further receive real-time data from each of the plurality of sensors associated with each of the set of IoT devices through an IoT protocol. The IoT protocol is an LWDCP. The universal integration device 102 may further monitor the real-time data received from each of the plurality of sensors at predefined time intervals through a Graphical User Interface (GUI). The universal integration device 102 may further manage one or more device parameters corresponding to each of the set of IoT devices in the heterogeneous communication network through the GUI based on the real-time data. The one or more device parameters include device properties, device configuration, device access controls, and the configuration parameters corresponding to each of the plurality of IoT sensors.

In some embodiments, the universal integration device 102 may include one or more processors 104 and a computer-readable medium 106 (for example, a memory). The computer-readable medium 106 may include metadata corresponding to each of the set of IoT devices. Further, the computer-readable storage medium 106 may store instructions that, when executed by the one or more processors 104, cause the one or more processors 104 to monitor the real-time data received from each of the plurality of sensors at predefined time intervals and manage one or more device parameters corresponding to each of the set of IoT devices in the heterogeneous communication network, in accordance with aspects of the present disclosure. The computer-readable storage medium 106 may also store various data (for example, real-time sensor data, configuration parameters corresponding to each of the plurality of IoT sensors, IoT protocol data, IoT gateway application data, security patches and Operating Systems (OS) corresponding to the IoT gateway application, and the like) that may be captured, processed, and/or required by the system 100.

The system 100 may further include a display 108. The system 100 may interact with a user via a GUI 110 accessible via the display 108. A user may monitor the real-time data received from each of the plurality of sensors at predefined time intervals through the GUI 110. Additionally, the user may one or more device parameters corresponding to each of the set of IoT devices in the heterogeneous communication network through the GUI 110 based on the real-time data. The system 100 may also include one or more external devices 112. In some embodiments, the universal integration device 102 may interact with the one or more external devices 112 over a communication network 114 for sending or receiving various data. The external devices 112 may include, but may not be limited to, a remote server, a digital device, or another computing system.

Figure 2:
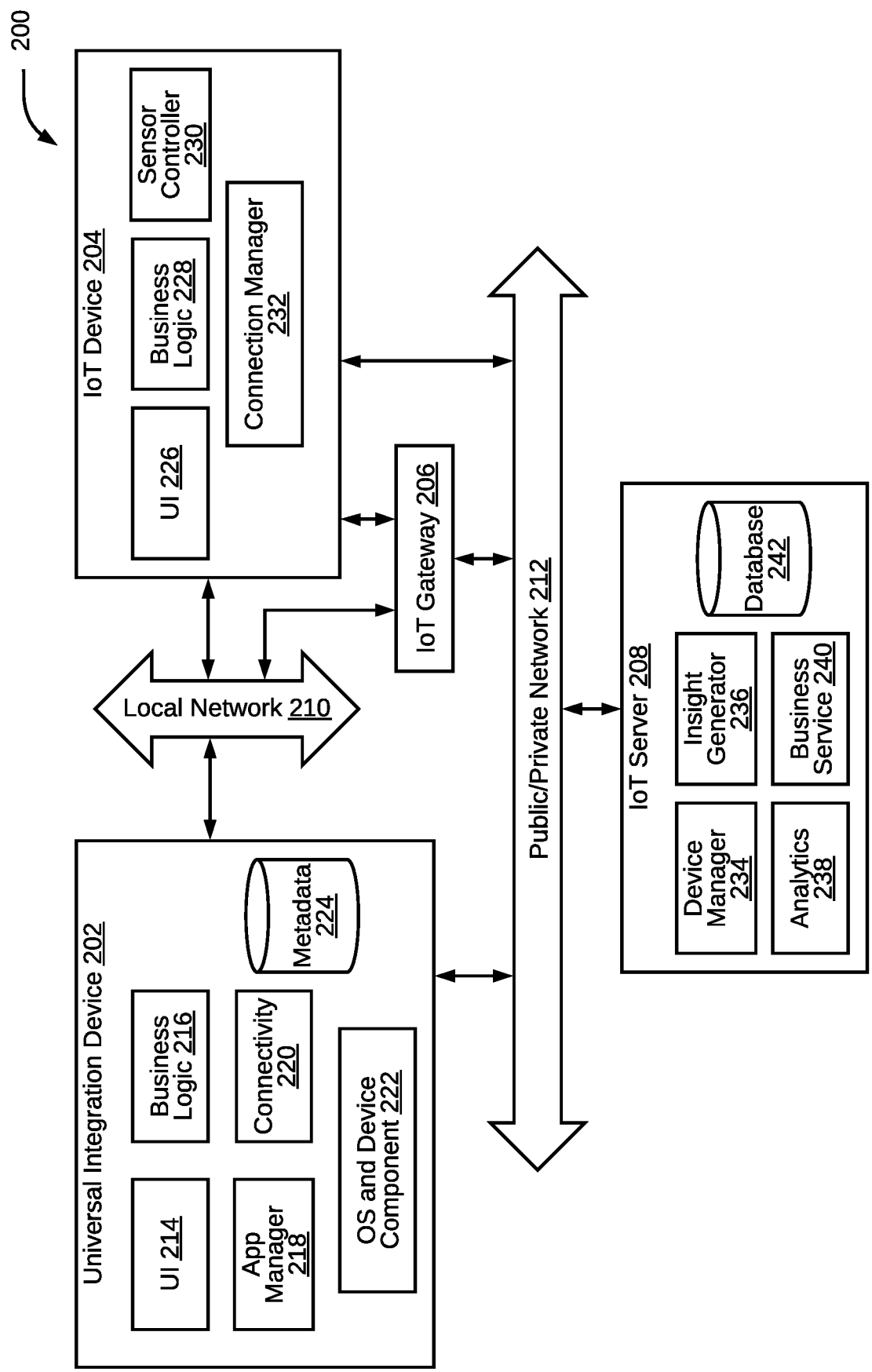
FIG. 2 is a functional block diagram of an exemplary system for managing IoT devices in heterogeneous communication networks, in accordance with some embodiments.

Referring now to FIG. 2, a functional block diagram of an exemplary system 200 for managing IoT devices in heterogeneous communication networks is illustrated, in accordance with some embodiments. The system 200 may include a universal integration device 202 (analogous to the universal integration device 102 of the system 100), an IoT device 204, an IoT gateway 206, and an IoT server 208. The universal integration device 202 is communicatively coupled with the IoT device 204 and the IoT gateway 206 via a local network 210. Further, each of the universal integration device 202, the IoT device 204, and the IoT gateway 206 is communicatively coupled with the IoT server 208 via a public/private network 212.

The universal integration device/system 202 includes a UI 214 (analogous to the GUI 110), a business logic 216, an app manager 218, connectivity 220, OS and device component 222, and metadata 224. The universal integration device 202 controls the IoT device 204 for an end user. In some embodiments, the universal integration device 202 acts as an IoT gateway for the end user to control the IoT device 204. Further, the universal integration device 202 provides a mechanism for Original Equipment Manufacturer (OEM) to add the IoT device 204 to a communication network (ecosystem). Further, the universal integration device 202 provides the metadata-driven dynamic rendering of the UI 214 as a universal mobile application for the end user. Further, the universal integration device 202 provides a mechanism for vertical specific customization. In an embodiment, the universal integration device 202 is a smartphone.

The IoT device 204 includes a UI 226, a business logic 228, a sensor controller 230, and a connection manager 232. The IoT device 204 is manufactured by an OEM. The IoT device 204 provides the UI 226 for the end user to monitor or control via the user integration device 202. Optionally, the IoT device 204 may provide an interface for the IoT gateway 206 to enable end user access. Further, the IoT device 204 provides an interface for communicating directly or remotely with the IoT server 208. In some embodiments, the system 200 may include a plurality of IoT devices. In such embodiments, the universal integration device 202 performs each of the above mentioned functions for each of the plurality of IoT devices.

In some embodiments, the IoT gateway 206 facilitates communication between the IoT device 204 and the IoT server 208. It may be noted that some OEMs design IoT devices such that communication with the IoT server is not possible without an IoT gateway. In such cases, the IoT gateway 206 provides an interface of abstraction for the IoT device 204. The user integration device 202 communicates with the IoT device 202 for any end user operations via IoT gateway 206. Further, the IoT server 208 communicates with the IOT device 204 via the IoT gateway 206. In some embodiments, the system 200 may not include the IoT gateway 206 (for example, when the IoT gateway 206 is not required by the IoT device 204 for accessing the IoT server 208 or when the universal integration device 202 is configured to act as an IoT gateway to facilitate communication between the IoT device 204 and the IoT server 208).

The IoT server 208 includes a device manager 234, an insight generator 236, analytics 238, business service 240, and database 242. The IoT server 208 is a service provider to onboard the IoT device 204 to the ecosystem. The IoT server 208 manages and controls the IoT device 204 remotely. Further, the IoT server 208 manages persistence data for all IoT devices in the ecosystem. Further, the IoT server 208 manages analytics and services-related operations. In some embodiments, the system 200 may include a plurality of IoT devices. In such embodiments, the IoT server 208 performs each of the above mentioned functions for each of the plurality of IoT devices.

The local network 210 is a connectivity module between the IoT device 204 or/and the IOT gateway 206 and the universal integration device 202. The local network 210 searches and finds IoT devices to onboard to the ecosystem. Further, the local network 210 establishes connection to control the IoT device 204. Further, the local network 210 sends and receives data over local network to monitor and control the IoT devices in the ecosystem. Further, the local network 210 sends commands to offboard the IoT devices from the ecosystem.

The public/private network 212 is a connectivity module which establishes communication between the IoT server 208 and each of the universal integration device 202, the IoT device 204, and the IOT gateway 206. The public/private network 212 allows communication of the universal integration device 202 and IOT devices from service provider. Further, the public/private network 212 allows access to the IoT devices from anywhere in the world. Further, notifications from a service provider to the end user or the IoT devices are established via the public/private network 212.

It should be noted that the system 200 may support an OEM to onboard any new IoT device to the ecosystem using a universal mobile application accessible via the universal integration device 202 to control the IoT devices locally or remotely. The universal mobile application architecture is unique, flexible, and supports static and dynamic onboarding of the IoT devices. Further, the system 200 provides an easy-to-use interface add new IoT devices to the ecosystem.

Figure 3A:
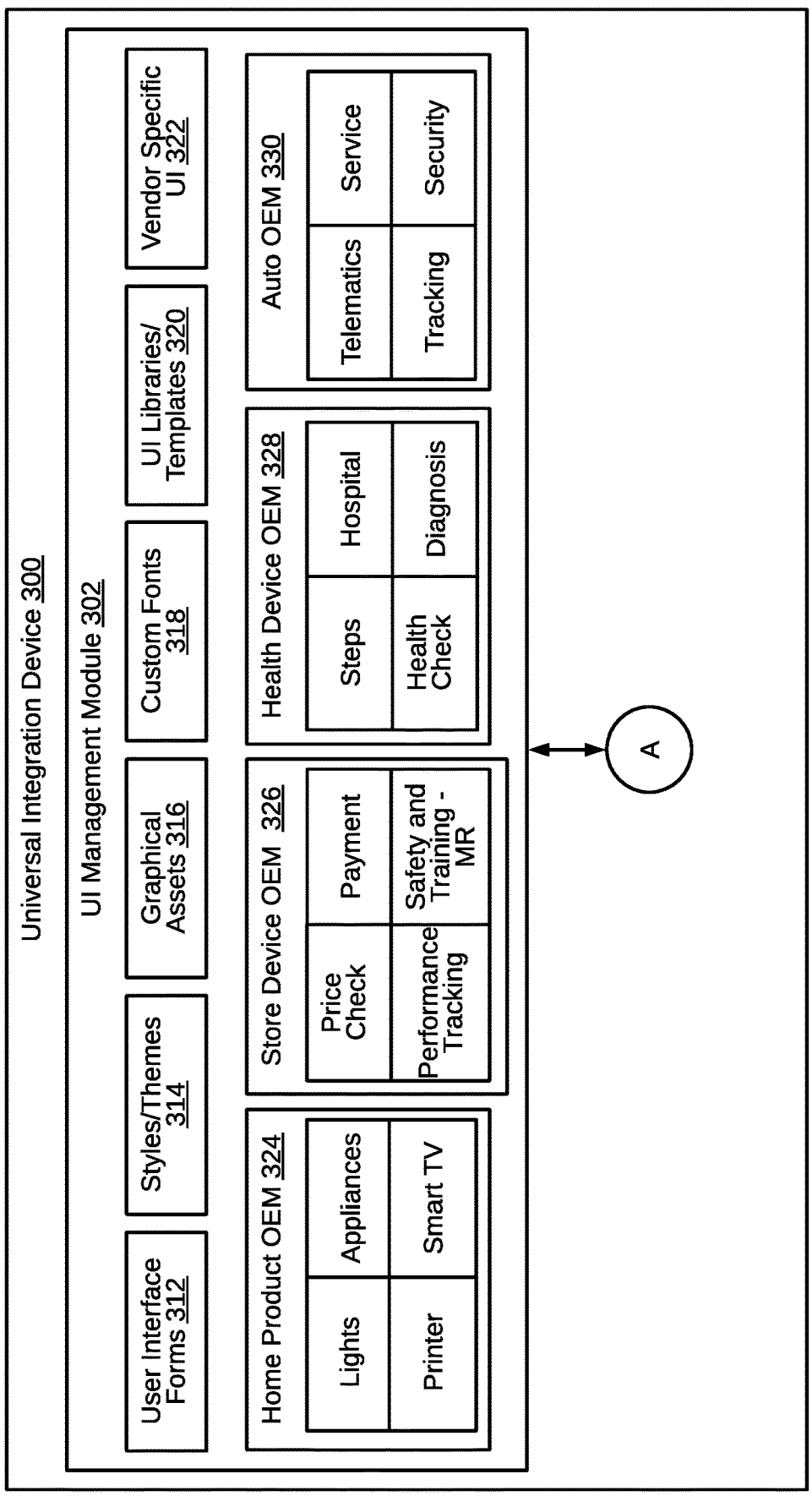
FIGS. 3A-B are a functional block diagram of a universal integration device implemented by the exemplary system of FIG. 2, in accordance with some embodiments.
Figure 3B:
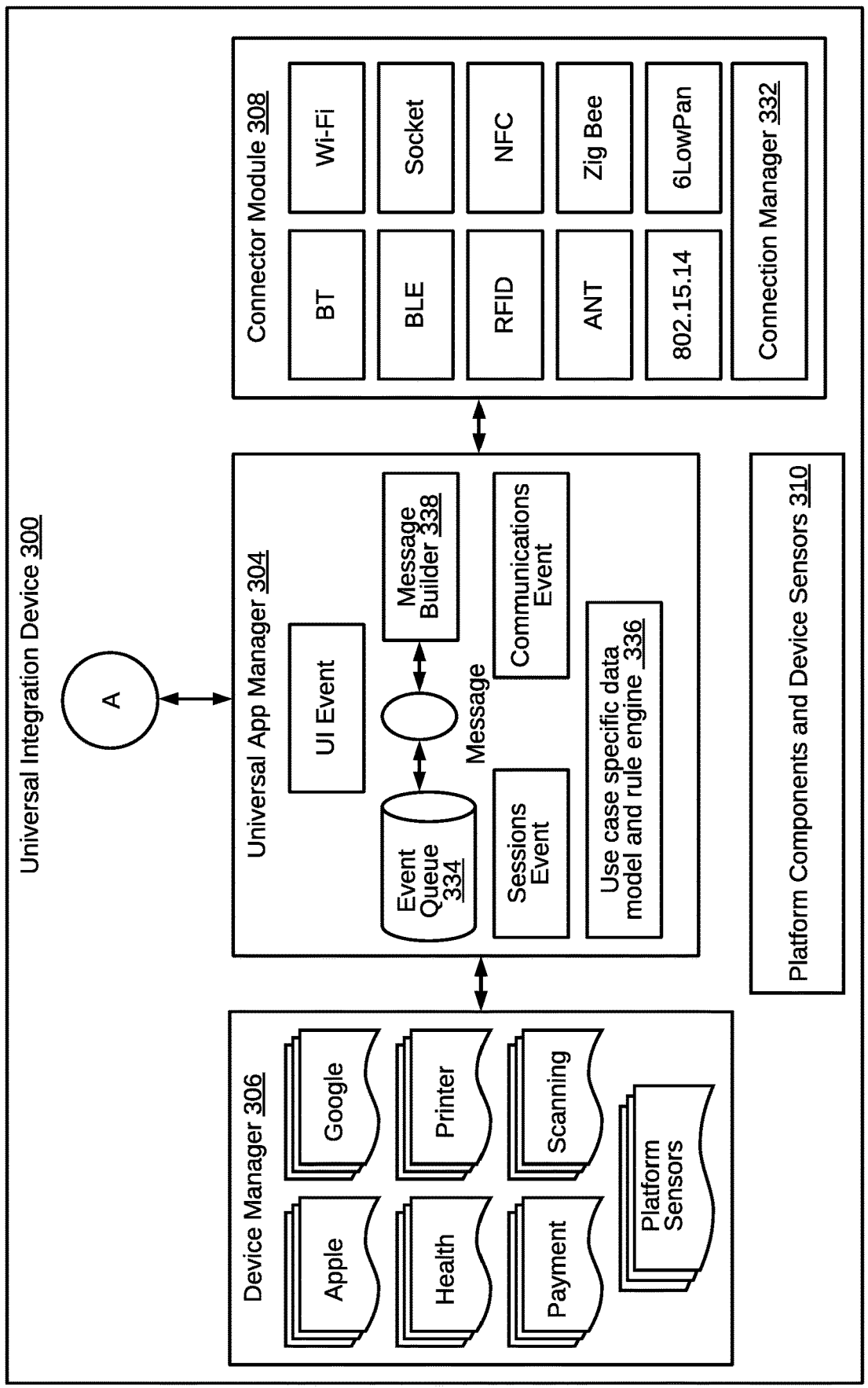

Referring now to FIGS. 3A-B, a functional block diagram of a universal integration device 300 (analogous to the universal integration device 102 implemented by the system 100) is illustrated, in accordance with some embodiments. The universal integration device 300 includes a UI management module 302, a universal app manager 304, a device manager 306, a connector module 308, and platform components and device sensors 310.

The UI management module 302 includes UI forms 312, styles/themes 314, graphical assets 316, custom fonts 318, UI libraries/templates 320, and vendor specific UI 322. Further, the UI management module 302 may include OEM-specific UI components. For example, a home product OEM 324 may include lights, appliances, printer, smart TV, or the like; a store device OEM 326 may include price check, payment, performance tracking, safety and MR based training, or the like; a health device OEM 328 may include steps, hospital, health check, diagnosis, or the like; and an auto OEM 330 may include telematics, service, tracking, security, or the like. Additional UI components may be added based on user and vendor-specific requirements and configurations. UI libraries may be developed in such a way that a business application may be developed based on metadata-driven rendering. Such UIs may be adoptable in any form factor.

The connector module 308 may include modules for a plurality of communication protocols such as, but not limited to, Bluetooth® (BT), Wireless Fidelity (Wi-Fi), Bluetooth® Low Energy (BLE), Socket, Radio Frequency Identification (RFID), Near Field Communication (NFC), ANT, Zig Bee, 802.15.14, 6LowPan, or the like. Additionally, the connector module 308 includes a connection manager 332.

The connector module 308 communicates with IoT devices via local network communication (mostly in wireless mode). Each of the IoT devices may use a predefined communication protocol to connect and communicate with the universal app manager 304. It may be noted that although a communication mode may be different but the communication protocol to be complied with by an OEM with the universal app manager 304 may be standard. The connector module 308 uses LWDCP protocol to discover and connect the IoT devices. Further, the connector module 308 communicates with IoT devices using the predefined communication protocols. Further, the connector module 308 monitors, operates, and controls the IoT devices.

Some IoT devices may be directly managed by the IoT server whereas other IoT devices may be managed locally via the universal mobile application or the IoT gateway. An OEM needs to comply with one or more predefined specifications. The device manager 306 enables compliance of the IoT devices with the universal integration device 300. The device manager 306 synchronizes with device manager of the IoT server. Further, the device manager 306 integrates the predefined specifications (for example, Google®, Apple®, health, printer, payment, scanning, platform sensors, etc.) of the IoT server. Further, the device manager 306 allows offline device management.

The universal app manager 304 includes an event queue 334, a use case specific data model and rule engine 336, and a message builder 338. The universal app manager 304 processes and routes events from necessary components. The universal app manager 304 may execute as a centralized event processing unit which may help to consume, process, and dispatch events (such as, UI events, sessions events, communications events, etc.) from all other components of the universal integration device 300 to meet identity of universal app concepts. The universal app manager 304 may maintain a state of the IoT devices based on use case demand. A configurable UI may be used to add and remove use case-specific behavior through the use case specific data model and rule engine 336. The universal app manager 304 manages and maintains the event queue 334. Further, the universal app manager 304 sends and receives events to process use cases. Further, the universal app manager 304 manages application state.

It should be noted that all such aforementioned modules 302-338 may be represented as a single module or a combination of different modules. Further, as will be appreciated by those skilled in the art, each of the modules 302-338 may reside, in whole or in parts, on one device or multiple devices in communication with each other. In some embodiments, each of the modules 302-338 may be implemented as a dedicated hardware circuit comprising a custom application-specific integrated circuit (ASIC) or gate arrays, off-the-shelf semiconductors such as logic chips, transistors, or other discrete components. Each of the modules 302-338 may also be implemented in an edge device such as a field programmable gate array (FPGA), programmable array logic, programmable logic device, and so forth. Alternatively, each of the modules 302-338 may be implemented in software for execution by various types of processors (e.g., processor 104). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for managing IoT devices in heterogeneous communication networks. For example, the exemplary system 200 and the associated universal integration device 202 may manage IoT devices in heterogeneous communication networks by the processes discussed herein. In particular, as will be appreciated by those of ordinary skill in the art, control logic and/or automated routines for performing the techniques and steps described herein may be implemented by the system 200 and the universal integration device 202 either by hardware, software, or combinations of hardware and software. For example, a suitable code may be accessed and executed by one or more processors on the system 200 to perform some or all of the techniques described herein. Similarly, application specific integrated circuits (ASICs) configured to perform some or all of the processes described herein may be included in the one or more processors on the system 200.

Figure 4A:
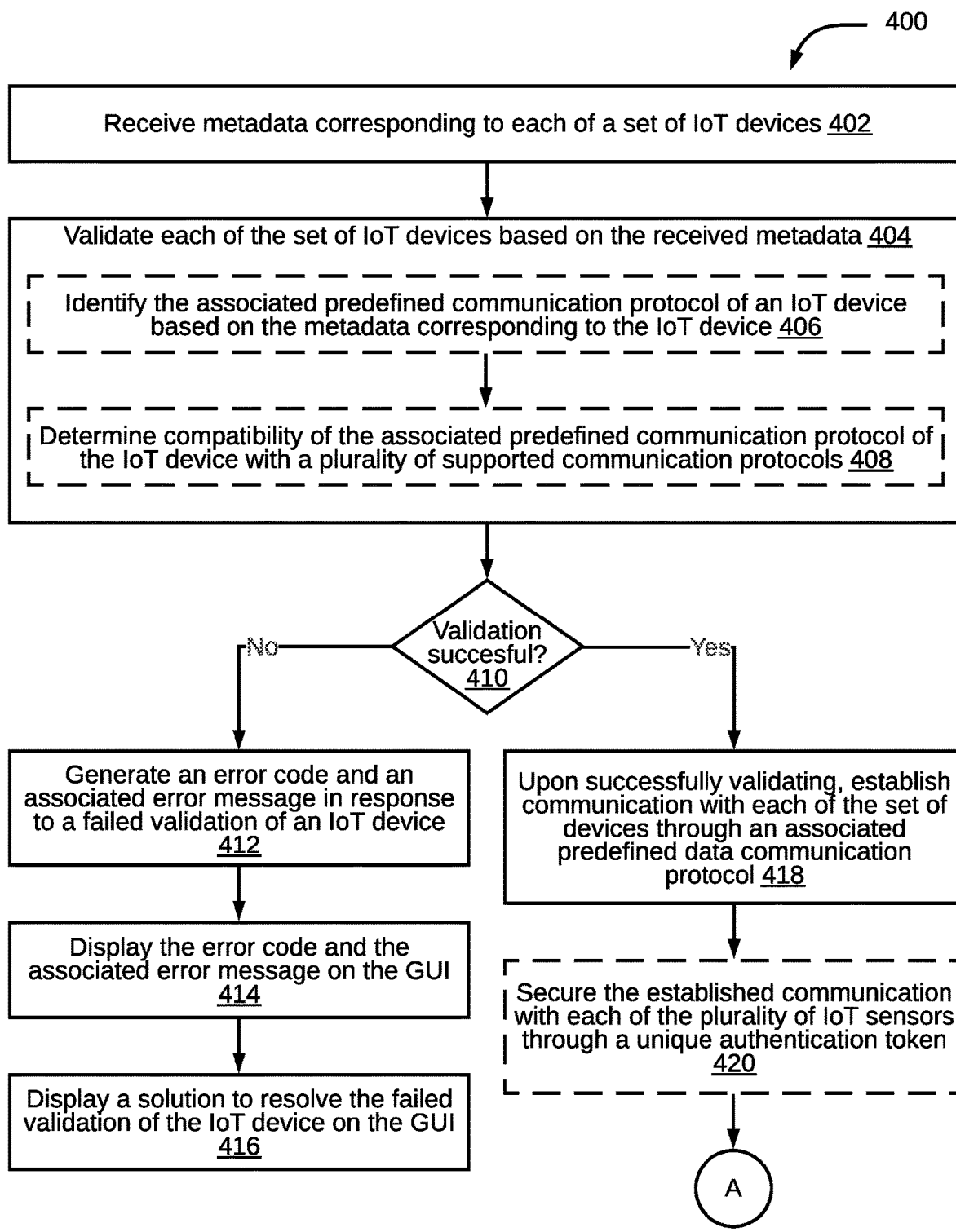
FIGS. 4A-B illustrate a flow diagram of an exemplary process for managing/onboarding IoT devices in heterogeneous communication networks, in accordance with some embodiments.
Figure 4B:
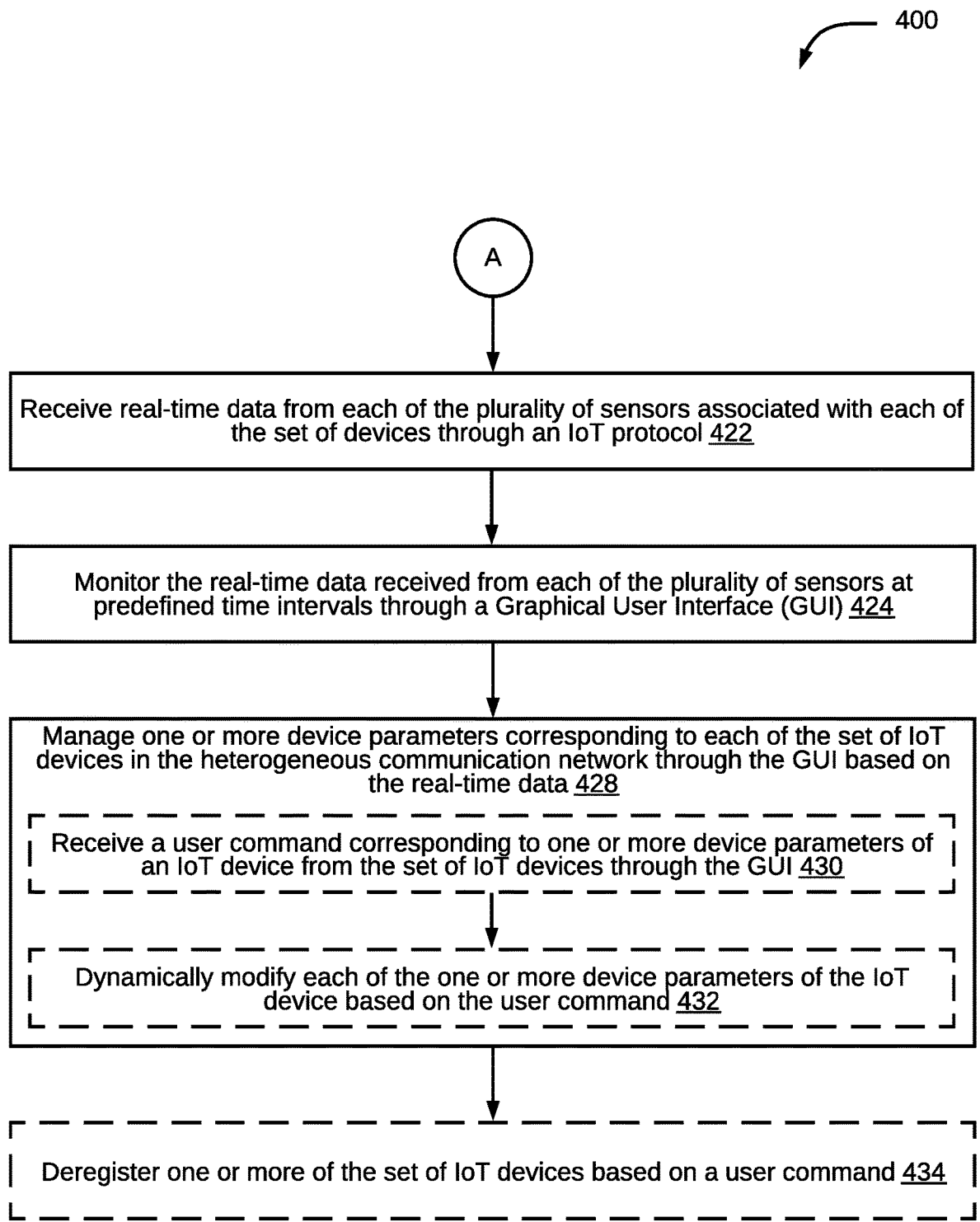

Referring now to FIGS. 4A-B, an exemplary process 400 for managing IoT devices in heterogeneous communication networks is depicted via a flowchart, in accordance with some embodiments of the present disclosure. In an embodiment, the process 400 may be implemented by the universal integration device 202 of the system 200. The process 400 may include receiving metadata corresponding to each of a set of IoT devices (such as, the IoT device 204), at step 402. A plurality of IoT sensors is associated with each of the set of IoT devices. The metadata includes configuration parameters corresponding to each of the plurality of IoT sensors. It may be noted that the metadata may be received through at least one of a Quick Response (QR) code associated with the IoT device, a server, and a communicatively coupled local machine. Further, the process 400 may include validating each of the set of IoT devices based on the received metadata, at step 404. Further, the step 404 of the process 400 may include identifying the associated predefined communication protocol of an IoT device based on the metadata corresponding to the IoT device, at step 406. Further, the step 404 of the process 400 may include determining compatibility of the associated predefined communication protocol of the IoT device with a plurality of supported communication protocols, at step 408.

Further, at step 410 of the process 400, a check may be performed to determine whether the validation is successful. When the validation is not successful, the process 400 may include generating an error code and an associated error message in response to a failed validation of an IoT device, at step 412. Further, the process 400 may include displaying the error code and the associated error message on the GUI (such as, the UI 214), at step 414. Further, the process 400 may include displaying a solution to resolve the failed validation of the IoT device on the GUI, at step 416.

When the validation is successful, the process 400 may include establishing communication with each of the set of IoT devices through an associated predefined data communication protocol, at step 418. The set of IoT devices is a part of a heterogeneous communication network. Further, the process 400 may include securing the established communication with each of the plurality of IoT sensors through a unique authentication token, at step 420. Further, the process 400 may include receiving real-time data from each of the plurality of sensors associated with each of the set of IoT devices through an IoT protocol, at step 422. In some embodiments, the IoT protocol is an LWDCP.

By way of an example, the universal integration device 300 may receive metadata corresponding to the IoT device 204 via the local network 210. Further, the universal integration device 300 may validate the metadata of the IoT device 204 and check whether the IoT device 204 is supported by the universal integration device 300 based on the metadata. Upon successfully validating the IoT device 204, the connector module 308 may establish communication between the universal integration device 300 and the IoT device 204. Further, the device manager 306 may synchronize and integrate required specifications for establishing a communication bridge between the IoT device 204 and the IoT server 208.

Further, the process 400 may include monitoring the real-time data received from each of the plurality of sensors at predefined time intervals through a GUI, at step 424. Further, the process 400 may include managing one or more device parameters corresponding to each of the set of IoT devices in the heterogeneous communication network through the GUI based on the real-time data, at step 426. The one or more device parameters include device properties, device configuration, device access controls, and the configuration parameters corresponding to each of the plurality of IoT sensors. Further, the step 426 of the process 400 may include receiving a user command corresponding to one or more device parameters of an IoT device from the set of IoT devices through the GUI, at step 428. Further, the step 426 of the process 400 may include dynamically modifying each of the one or more device parameters of the IoT device based on the user command, at step 430. Further, the process 400 may include deregistering one or more of the set of IoT devices based on a user command, at step 432.

In continuation of the example above, the universal app manager 304 may communicate with each of the plurality of sensors of the IoT device 204. The IoT device 204 may be monitored by the end user via the UI 214 (accessible via the UI management module 302 of the universal integration device 300). Further, the end user may modify one or more device parameters of the IoT device 204 by a user command through the UI 214.

Figure 5:
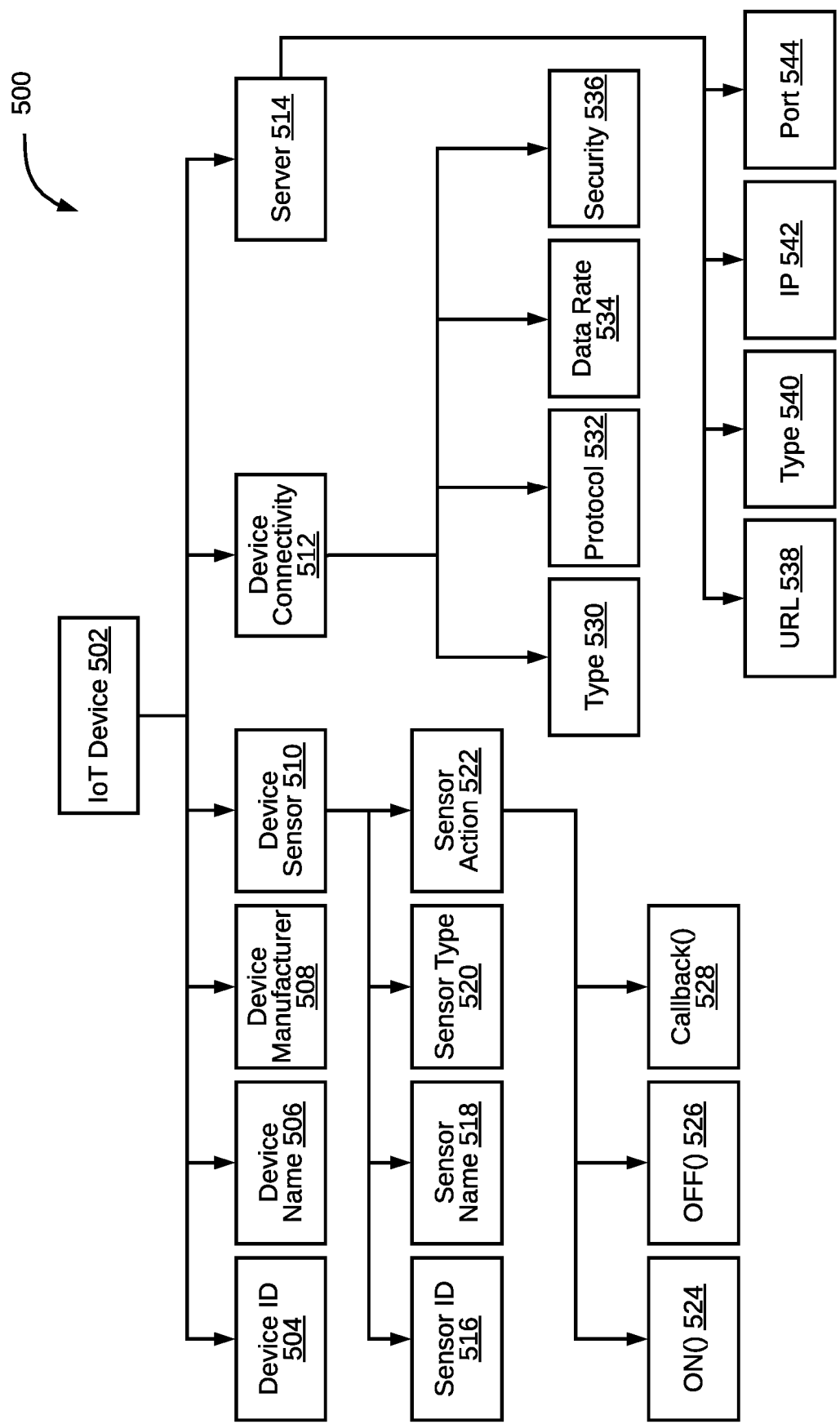
FIG. 5 illustrates a hierarchical structure of configuration parameters of an IoT device, in accordance with some embodiments.

Referring now to FIG. 5, a hierarchical structure 500 of configuration parameters of an IoT device 502 is illustrated, in accordance with some embodiments. The IoT device 502 may be analogous to the IoT device 204 of the system 200. By way of an example, the configuration parameters of the IoT device 502 may include a device Identifier (ID) 504, a device name 506, a device manufacturer 508, a device sensor 510, device connectivity 512, and a server 514. Configuration parameters corresponding to the device sensor 510 may include a sensor ID 516, a sensor name 518, a sensor type 520, and sensor action 522. Configuration parameters corresponding to the sensor action 522 may include ON( ) 524, OFF( ) 526, and Callback( ) 528.

Configuration parameters corresponding to the device connectivity 512 may include type 530, protocol 532, data rate 534, and security 536. Configuration parameters corresponding to the server 514 may include Uniform Resource Locator (URL) 538, type 540, Internet Protocol (IP) 542, and port 544.

Referring now to FIG. 6, an exemplary table 600 showing configuration parameters 602 and a description 604 corresponding to each of the configuration parameters 602 is illustrated, in accordance with some embodiments. By way of an example, the table 600 may include configuration parameters device ID 606, device name 608, device manufacturer 610, device sensor[ ] 612, sensor ID 614, sensor type 616, sensor name 618, ON( ) 620, Off( ) 622, CallBack ( ) 624, connectivity type 626, connectivity protocol 628, connectivity data rate 630, connectivity security 632, server URL 634, server type 636, server IP 638, server port 640

In some embodiments, device ID 606 may imply unique ID used as key to identify an IoT device, device name 608 may imply a name of the IoT device used to notify end user for any critical message, device manufacturer 610 may imply OEM details for the IoT device for any OEM-related business rule development, device sensor[ ] 612 may indicate that a device may include multiple sensors (array of sensors), Sensor ID 614 is a unique ID used as key to identify a sensor, sensor type 616 may include a description of sensor, sensor name 618 is name of the sensor, ON( ) 620 may imply a method to start the sensor, Off( ) 622 may imply a method to stop the sensor, CallBack ( ) 624 may imply a callback method for read sensor value, connectivity type 626 may imply type of connectivity between universal mobile application and the IoT device, connectivity protocol 628 may imply a protocol used for data communication between universal mobile application and the IoT device, connectivity data rate 630 may imply maximum data rate, connectivity security 632 may imply security parameters used by OEM, server URL 634 may imply a URL for the IoT device to send data of the IoT device, server type 636 may imply connection type between universal mobile application and the IoT server, server IP 638 may indicate IP address of the IoT server, and server port 640 may indicate port of the IoT server to send the data.

Referring now to FIG. 7, an exemplary structure 700 of message data 702 of response/request messages between a smartphone and an IoT device is illustrated, in accordance with some embodiments. The message data 702 corresponding to a request may include a request type 704 and a request payload 706. The message data 702 corresponding to a response may include the request type 704 for which the response is generated and a response payload 708. Further, the response payload 708 may include an error code 710 and response data 712 corresponding to the response.

Referring now to FIG. 8, an exemplary table 800 showing request type 802 and a description 804 corresponding to the request type 802 is illustrated, in accordance with some embodiments. By way of an example, the table 800 may include request types ATTACH_DEVICE 806, DETACH_DEVICE 808, AUTH_TOKEN 810, DEVICE_QUERY 812, DEVICE_COMMAND 814, DEVICE_NOTIFICATION 816, NEW_SENSOR_REQUEST 818, SENSOR_REQUEST_CANCELLATION 820, REQUEST_MOBILE_ACK 822, RECORD_DEVICE_ACK 824, REGISTER_FOR_NOTIFICATION 826, and UNREGISTER_FOR_NOTIFICATION 828.

In some embodiments, ATTACH_DEVICE 906 may imply to request from universal mobile application to an IoT device to register in universal platform, DETACH_DEVICE 908 may imply to request from universal mobile application to the IoT device to deregister in universal platform, AUTH_TOKEN 910 may imply to create and share a unique token (for example, IoT device identifier) which may be used for subsequent communications, DEVICE_QUERY 912 may imply to query IoT device for a list of sensors available on the IoT device, DEVICE_COMMAND 914 may imply to request the IoT device to provide a list of methods/Key Performance Indicators (KPIs) for a sensor, DEVICE_NOTIFICATION 916 may imply to request call back details for sensors data, NEW_SENSOR_REQUEST 918 may imply to request the IoT device to provide the current sensors data, SENSOR_REQUEST_CANCELLATION 920 may imply to cancel a request unilaterally (either by user, by mobile, or in emergency), REQUEST_MOBILE_ACK 922 may imply to send the request from the mobile after the request is delivered seeking confirmation and feedback from the IoT device, RECORD_DEVICE_ACK 924 may imply to record acknowledgement for a delivered request, REGISTER_FOR_NOTIFICATION 926 may imply to request the IoT device to send notifications to mobile app, and UNREGISTER_FOR_NOTIFICATION 928 may imply to request the IoT device to stop sending notifications to universal mobile application.

Referring now to FIG. 9, an exemplary table 900 showing an error code 902 and a description 904 corresponding to the error code 902 is illustrated, in accordance with some embodiments. By way of an example, the table 900 may include error codes NO_ERROR 906, INVALID_TOKEN 908, UNAUTHORIZED 910, SYSTEM_FAILURE 912, QUERY_FAILED 914, INVALID_METHOD 916, DEVICE_BUSY 918, INTERVAL_REJECTED 920, INVALID_REQUEST 922, and UNEXPECTED_REQUEST 924.

In some embodiments, NO_ERROR 906 may imply that request was successfully processed by the recipient, INVALID_TOKEN 908 may imply that request did not contain a valid token (device identifier), UNAUTHORIZED 910 may imply that requested operation was disallowed, SYSTEM_FAILURE 912 may indicate some device failure due to which request could not be processed, QUERY_FAILED 914 may imply that requested query could not be resolved, INVALID_METHOD 916 may indicate that sensor do not include requested method, DEVICE_BUSY 918 may indicate that sensor is busy and request the user to try after some time, INTERVAL_REJECTED 920 may indicate that interval proposed for data retrieval between mobile and device is rejected, INVALID_REQUEST 922 may imply that the request was disallowed because it was improperly formatted, and UNEXPECTED_REQUEST 924 may indicate that the request was disallowed because the request was sent out of context (for example, cancelling a request which was never placed.

Figure 10:
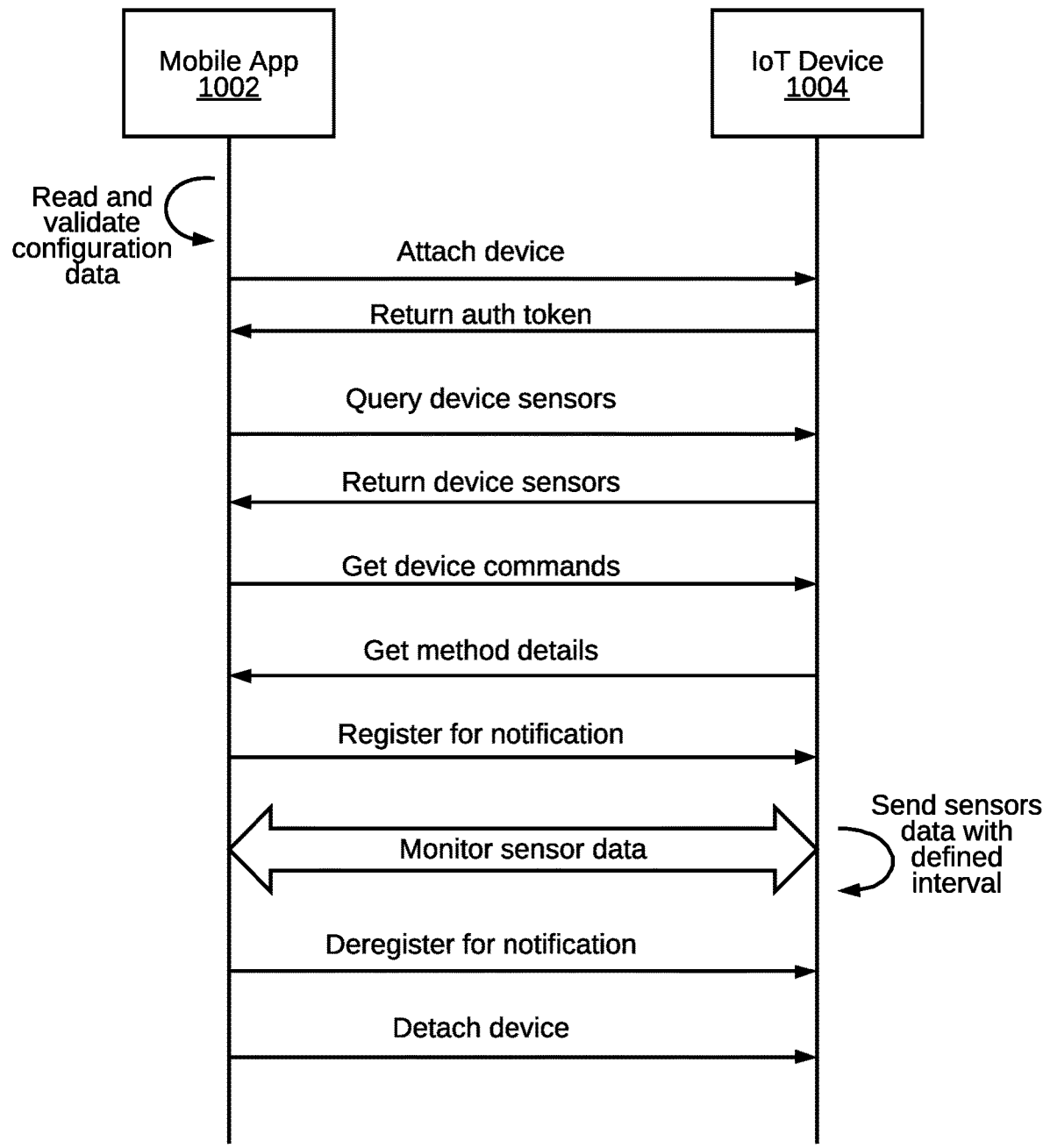
FIG. 10 illustrates data exchange between a mobile application and an IoT device, in accordance with some embodiments.

Referring now to FIG. 10, data exchange between a mobile application 1002 and an IoT device 1004 is illustrated, in accordance with some embodiments. The mobile application 1002 may be accessible via the universal integration device 300. Upon reading and successfully validating configuration data of the IoT device 1004, the mobile application 1002 may attach the IoT device 1004 by registering the IoT device 1004 and creating a unique authentication (AUTH) token. The IoT device 1004 may return the AUTH token.

Further, the communication between the mobile application 1002 and the IoT device 1004 may be established. The mobile application 1002 may query for IoT device sensors information. The IoT device 1004 may return the IoT device sensors information. Further, the mobile application 1002 may receive device commands from the IoT device 1004. Further, the IoT device 1004 may receive method details from the mobile application 1002. Further, the mobile application 1002 may register the IoT device 1004 for notifications. The mobile application 1002 may receive and monitor sensor data from the IoT device 1004 at predefined time intervals. Additionally, the mobile application 1002 may deregister the IoT device 1004 for notifications based on end user command or any errors in communication. Further, the mobile application 1002 may detach the IoT device 1004 from the heterogeneous communication network. LWDCP message flows are suggestive message flows whereas an OEM may redefine the message flows based on vertical and target use cases to realize for the IoT device sensors.

Figure 11:
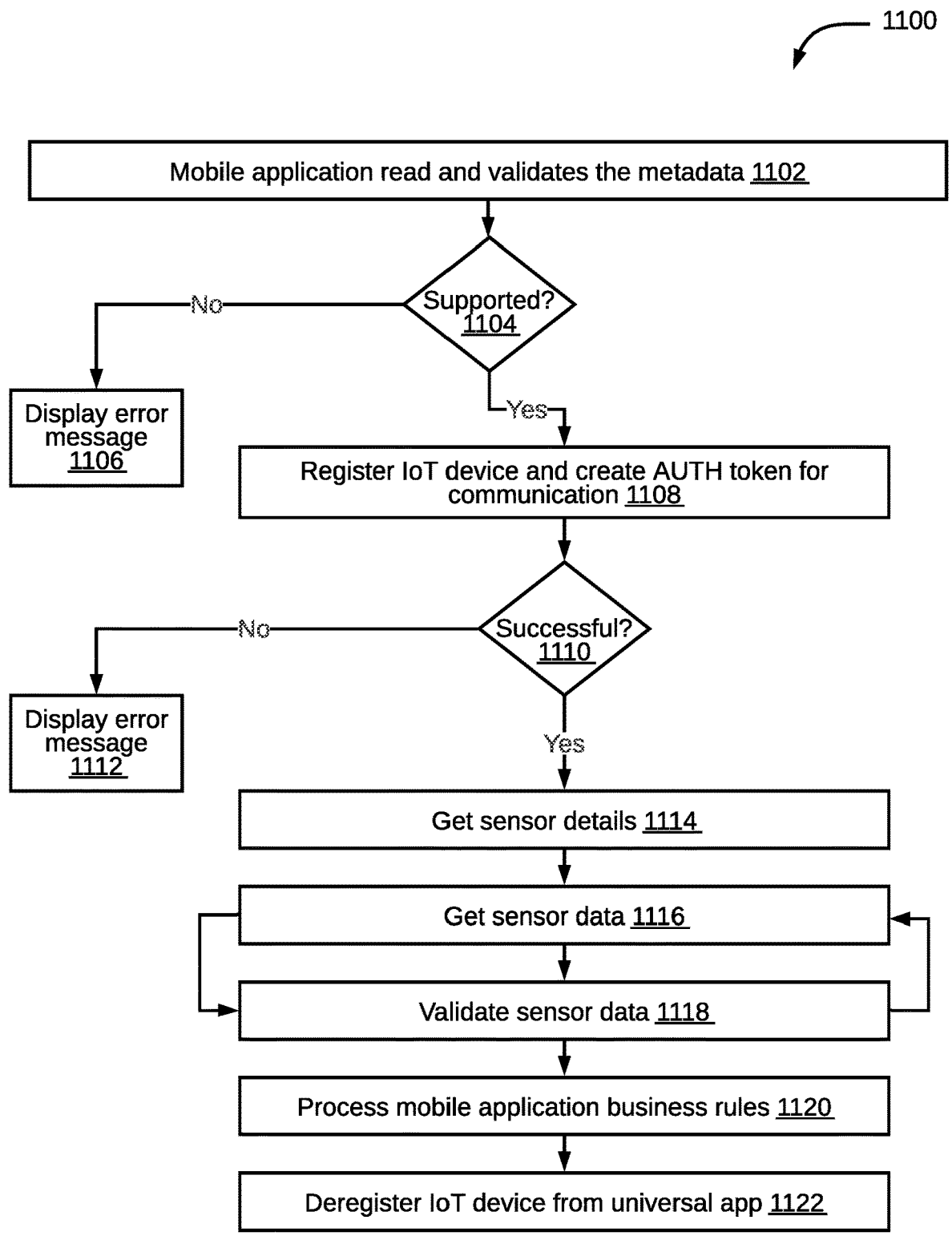
FIG. 11 illustrates a flow diagram of an exemplary control logic for managing IoT devices in heterogeneous communication networks, in accordance with some embodiments.

Referring now to FIG. 11, an exemplary control logic 1100 for managing IoT devices in heterogeneous communication networks is depicted via a flow chart, in accordance with some embodiments. In an embodiment, the control logic 1100 may be implemented by the universal integration device 202 of the system 200. The control logic 1100 may include reading and validating the metadata through the mobile application, at step 1102. The universal mobile application (accessible via the universal integration device 202) may receive the metadata corresponding to an IoT device and may include an option to read the metadata for details of the IoT device. The metadata may define the details of the IoT device (such as, device ID, connectivity protocol, communication protocol, and other parameters) to identify and communicate with the IoT device from the universal mobile application.

Further, at step 1104 of the control logic 1100, a check may be performed to determine whether the IoT device is supported by the universal mobile application. When the IoT device is not supported by the universal mobile application, the control logic 1100 may further include displaying an error message at step 1106. The control logic 1100 may terminate upon displaying the error message. In some embodiments, a corresponding solution may be displayed along with the error message to end user.

When the IoT device is supported by the universal mobile application, the control logic 1100 may further include registering IoT device and creating AUTH token for communication, at step 1108. The universal mobile application may register or onboard the IoT device. Further, the universal mobile application may generate a unique authentication token for communication between the universal mobile application and the IoT device.

Further, at step 1110 of the control logic 1100, a check may be performed to determine whether the IoT device is successfully registered. When the IoT device is not successfully registered, the control logic 1100 may include displaying an error message at step 1112. The control logic 1100 may terminate upon displaying the error message. In some embodiments, a corresponding solution may be displayed along with the error message to end user.

When the IoT device is successfully registered, the control logic 1100 may include getting sensor details, at step 1114. The universal mobile application may read all supported sensors by the registered IoT device. Further, the control logic 1100 may include getting sensor data, at step 1116. Further, the control logic 1100 may include validating sensor data, at step 1118. In some embodiments, the step 1116 and the step 1118 are iteratively performed in real-time at predefined time intervals.

Further, the control logic 1100 may include processing universal mobile application business rules, at step 1120. Throughout a life cycle of each of the sensors, the universal mobile application may monitor or retrieve the real-time data from a selected sensor for business rule processing. It may be noted that business rules are predefined for a sensor and depend upon OEM and/or service provider for use case implementation. Further, the control logic 1100 may include deregistering IoT device from universal app, at step 1122. The universal mobile application may deregister the IoT device upon task completion or on demand.

Figure 12:
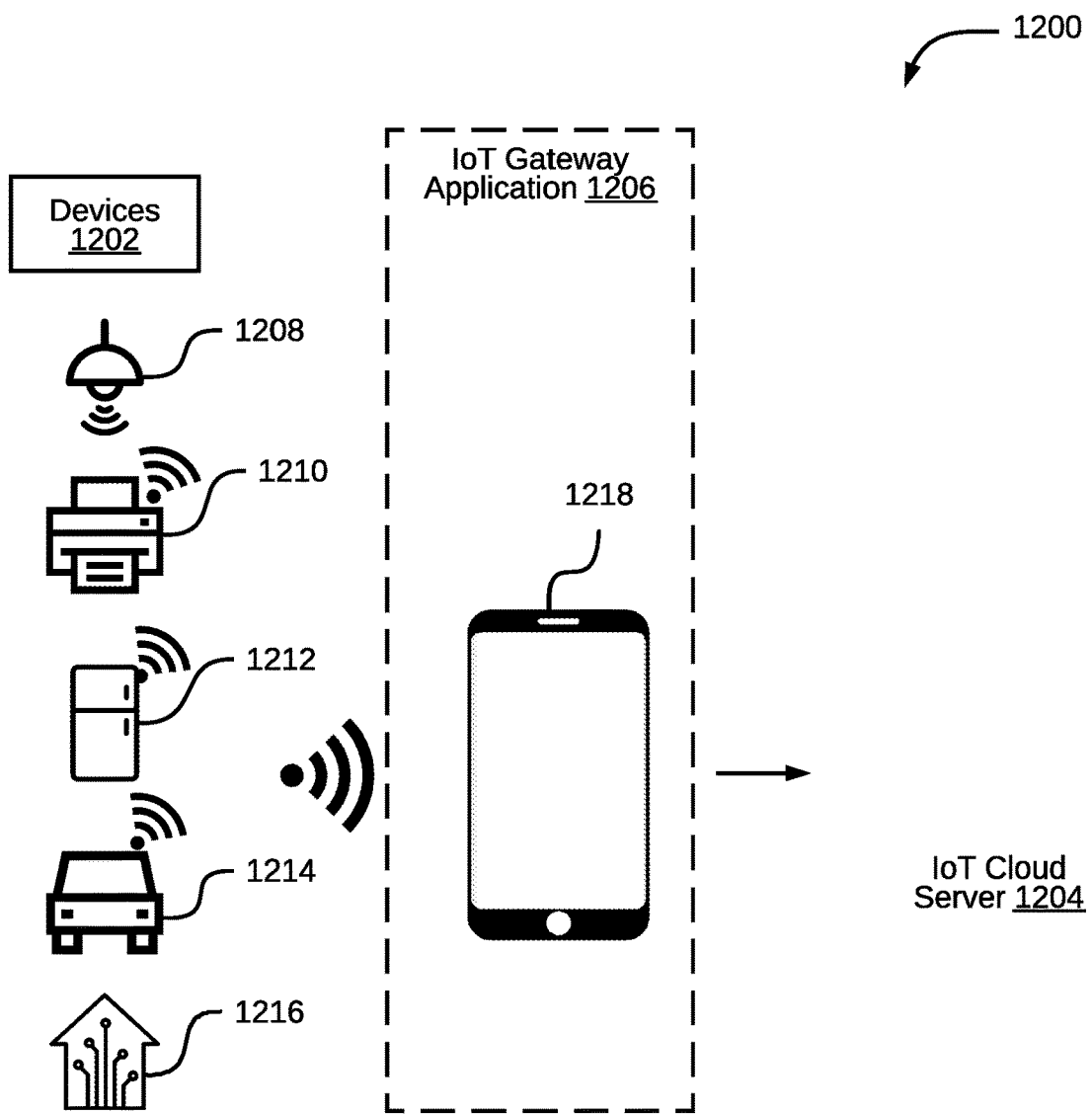
FIG. 12 illustrates communication between each of a set of IoT devices and an IoT cloud server through an IoT gateway application, in accordance with some embodiments.

Referring now to FIG. 12, communication between each of a set of devices 1202 and an IoT cloud server 1204 through an IoT gateway application 1206 is illustrated, in accordance with some embodiments. By way of an example, the set of devices 1202 may include a smart light 1208, a smart printer 1210, a smart fridge 1212, a smart car 1214, a smart home 1216, and the like. It may be noted that IoT devices should be able to connect to the IoT cloud server 1204 without any proprietary gateway or hub. A smartphone (such as, the smartphone 1218) may be used as a universal gateway for any type of IoT sensor to connect to the IoT cloud server 1204. The IoT gateway application 1206 may be extended to act as an IoT gateway to cover network and non-network IoT devices.

The universal mobile application may act as a universal gateway perform real-time data collection from the IOT sensors, buffering the real-time data prior to preprocessing, preprocessing the real-time data, transferring results to the IOT cloud server 1204, deciding whether the real-time data at a given stage of processing should be temporary, persistent, or kept in memory. Therefore, the universal mobile application may allow plugging-in of any IoT sensors to connect to the IoT cloud server 1204.

Figure 13:
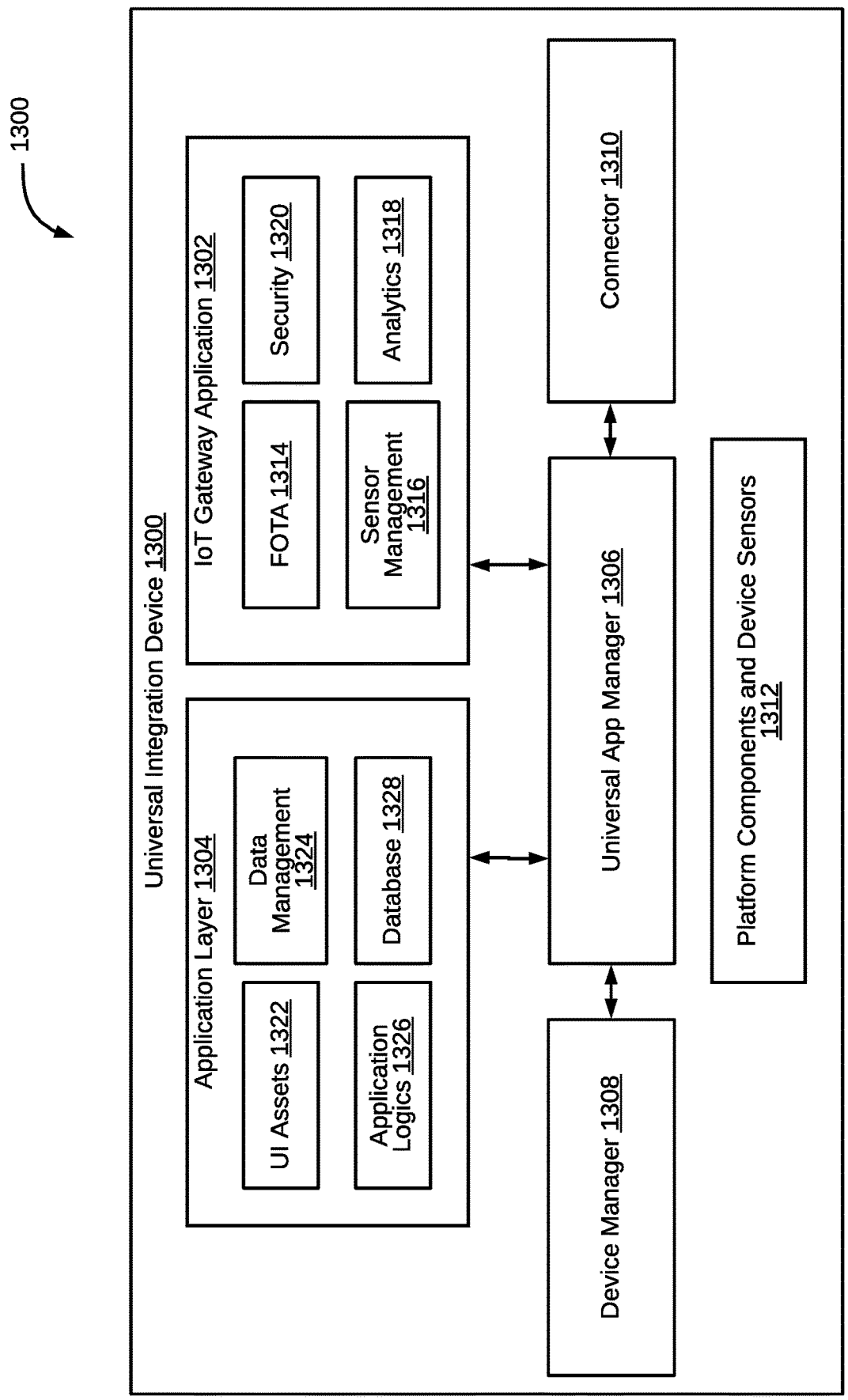
FIG. 13 is a functional block diagram of a universal integration device for monitoring each of a set of IoT devices through an IoT gateway application, in accordance with some embodiments.

Referring now to FIG. 13, a functional block diagram of a universal integration device 1300 for monitoring each of a set of devices through an IoT gateway application 1302 is illustrated, in accordance with some embodiments. The universal integration device 1300 may be analogous to the universal integration device 202 of the system 200. The universal integration device 1300 may include the IoT gateway application 1302, an application layer 1304 (analogous to the UI management module 302), a universal app manager 1306 (analogous to the universal app manager 304), a device manager 1308 (analogous to the device manager 306), a connector module 1310 (analogous to the connector module 308), and platform components and device sensors 1312 (analogous to the platform components and device sensors 310). Further, the application layer 1304 (analogous to the UI management module 302) may include a UI assets module 1322, a data management module 1324, an application logistics module 1326, and database 1328.

A universal mobile application accessible via the universal integration device 1300 may be analogous to the universal mobile application accessible via the universal integration device 300 with an additional component of the IoT gateway application 1302. The IoT gateway application 1302 may implement IoT gateway-related use cases such as, FOTA 1314 (updates module to ensure that the IoT gateway application software and sensors are updated with latest versions of security patches, OS, and the like), sensors management module 1316 (manages different types of sensor devices and properties, configurations and access controls for IOT sensors), and device analytics module 1318 (additionally built to manage behavior of the end user as well as the IoT device). The data may be secure with universal mobile application security 1320. For additional security of sensitive data, the OEM may use any encryption mechanism.

Figure 14:
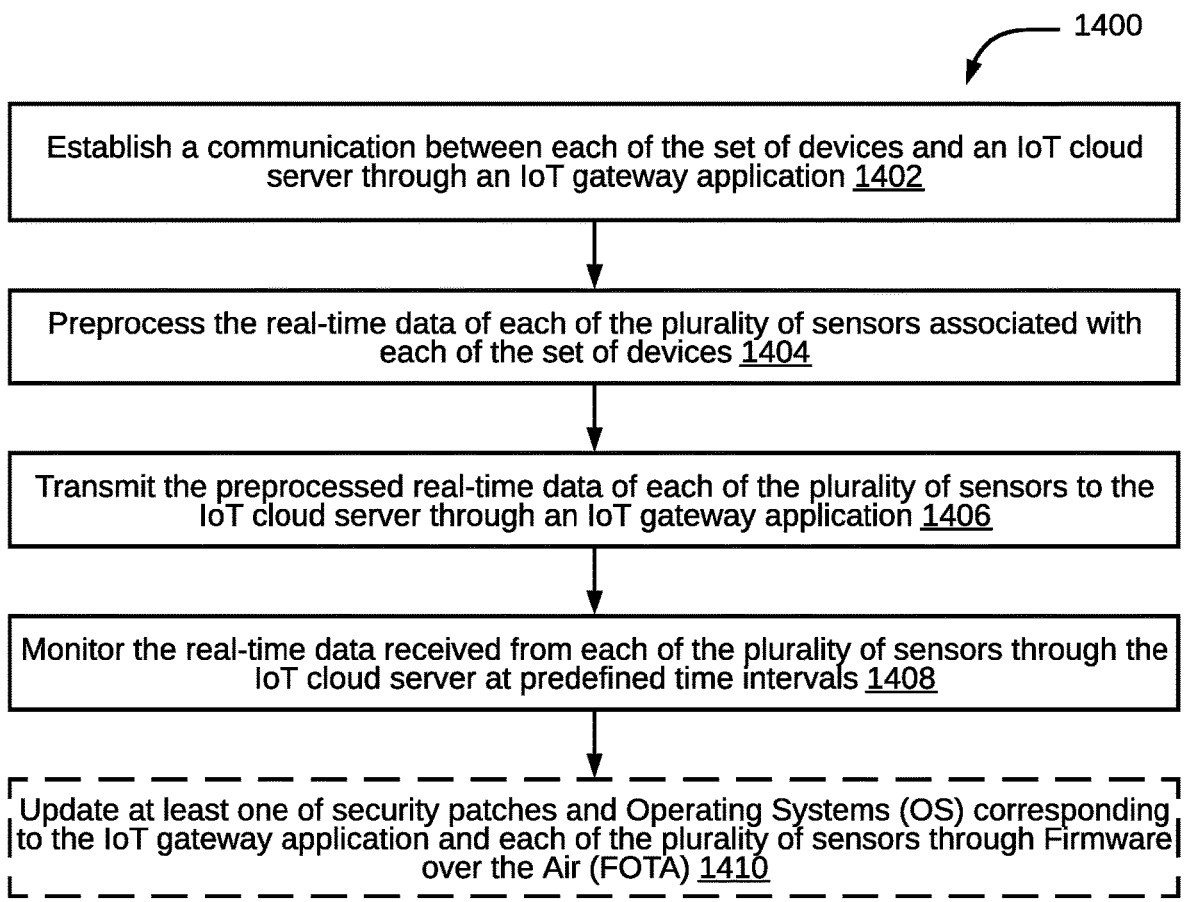
FIG. 14 illustrates a flow diagram of an exemplary process for monitoring each of a set of IoT devices through an IoT gateway application, in accordance with some embodiments.

Referring now to FIG. 14, an exemplary process 1400 for monitoring each of a set of IoT devices through an IoT gateway application is depicted via a flow chart, in accordance with some embodiments. In an embodiment, the process 1400 may be implemented by the universal integration device 202 of the system 200. The process 1400 may include establishing a communication between each of the set of devices and an IoT cloud server through an IoT gateway application, at step 1402.

Further, the process 1400 may include preprocessing the real-time data of each of the plurality of sensors associated with each of the set of devices, at step 1404. Further, the process 1400 may include transmitting the preprocessed real-time data of each of the plurality of sensors to the IoT cloud server through an IoT gateway application, at step 1406. Further, the process 1400 may include monitoring the real-time data received from each of the plurality of sensors through the IoT cloud server at predefined time intervals, at step 1408. Further, the process 1400 may include updating at least one of security patches and OS corresponding to the IoT gateway application and each of the plurality of sensors through FOTA(Firmware Over-The-Air).

Figure 15:
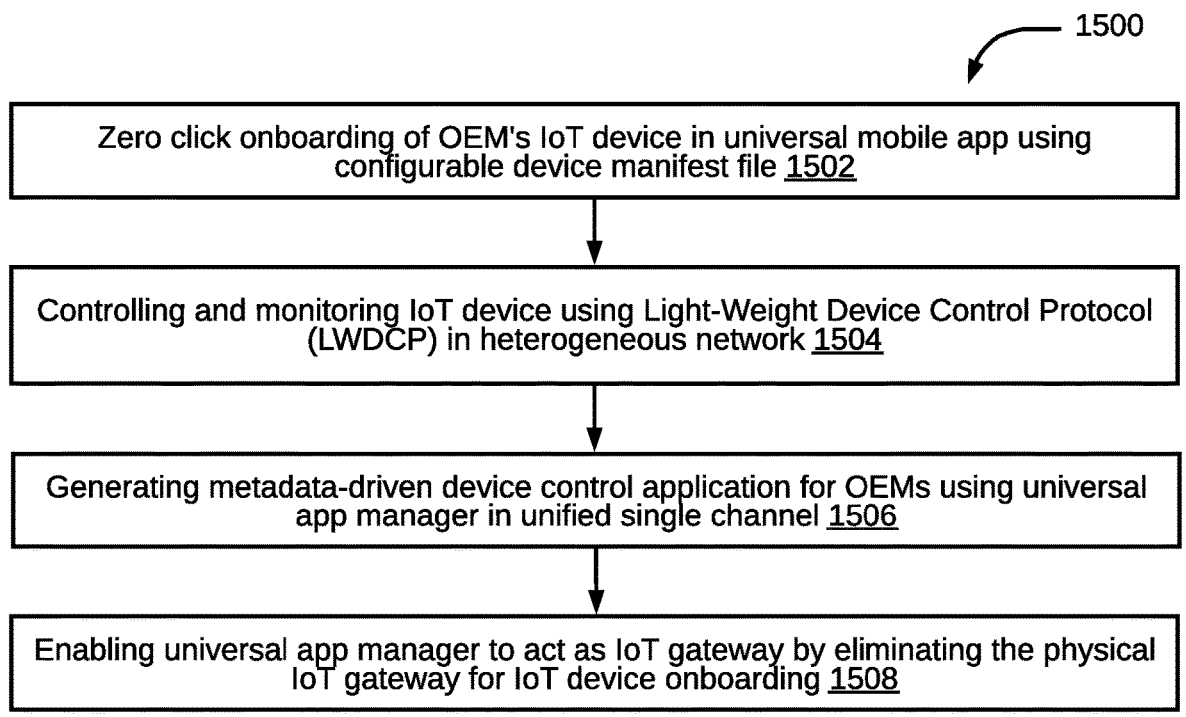
FIG. 15 illustrates a flow diagram of a detailed exemplary process for monitoring each of a set of IoT devices through an IoT gateway application, in accordance with some embodiments.

Referring now to FIG. 15, a detailed exemplary process 1500 for monitoring each of a set of IoT devices through an IoT gateway application is depicted via a flow chart, in accordance with some embodiments. The process 1500 includes zero click onboarding of OEM's IoT device in universal mobile application using configurable device manifest file, at step 1502. Details corresponding to the IoT device are required to onboard the IoT device to the ecosystem. The ecosystem may be a heterogeneous communication network. The details corresponding to the IoT device may be updated either as metadata including configurable parameters or may be scanned as QR code-based data embedded by the OEM on the IoT device. The configurable parameters (manifest file) for the IoT device may provide necessary details for the universal mobile application (accessible via the universal integration device 202) to understand, pair, and communicate with the IoT device. The manifest file may include IoT device details along with supported sensors, connectivity details, and corresponding IoT sever details. The metadata may be stored as a simple ASCII file or as encrypted data (when the metadata is sensitive for OEM). During execution, the universal mobile application may read and scan the metadata in main memory for future method execution.

The metadata may be onboarded dynamically (Zero click) in multiple ways. In an embodiment, the metadata may be onboarded by scanning a unique QR code associated with the IoT device when IoT device-related data may be embedded within the unique QR code. In another embodiment, the metadata may be onboarded by pushing the metadata or the manifest file from the IoT server. The metadata or the manifest file may be stored and pushed from the IoT server in XML/JSON format using push notification mechanism of mobile. In another embodiment, the metadata may be onboarded by pushing the metadata or the manifest file from a local machine. A configuration file may be pushed from any local machine with a supported OBject EXchange (OBEX) connection. The universal mobile application validates the metadata to check the compliance for supported protocols by the universal mobile application.

Further, the process 1500 includes controlling and monitoring IoT device using LWDCP in heterogeneous network, at step 1504. The universal mobile application may analyze the IoT device details from the configuration parameters in the metadata. The universal mobile application may validate compliance of compatibility of the IoT device with the heterogeneous communication network and the LWDCP.

Further, in a "Good Case" (successful addition of the IoT device to the heterogeneous network), the successful addition of the IoT device may be notified to the end user and the universal mobile application may establish the communication with the IoT device. In an "Error Case" (when the IoT device is not in compliance with universal mobile application standards), the universal mobile application may generate an error code and a corresponding message to be displayed to the end user. Optionally, a solution to fix the error may be displayed along with the error code and the corresponding message.

The LWDCP may include relevant messages to transfer data between the universal mobile application to discover, start, stop, and callback Application Programming Interfaces (APIs). It should be noted that a data transfer protocol is a standardized format for transmitting data between two devices. For a particular OEM and IoT device, (Machine to Machine (M2M)) message exchange, the universal mobile application may adopt any of standard protocols based on specifications of the IoT device and may update the adopted standard protocols as configuration parameters. By way of an example, some standard M2M communication protocols are FTP, UDP, TCP/IP, HTTP, HTTPS, COAP, MQTT, XMPP, AMQP, LORA, and the like. When an IoT device vendor may want to adopt any proprietary communication protocol, the device vendor may need to work with a universal mobile application developer for compliance and compatibility. LWDCP message flows are suggestive message flows whereas the OEM may redefine the LWDCP message flows based on vertical and target use cases to realize for device sensors.

Further, the process 1500 includes generating metadata-driven device control application for OEMs using universal app manager in unified single channel, at step 1506. The OEM may adopt technologies to develop the universal mobile application (for example, the universal mobile application may be a pure native of iOS and Android, or may be cross platform such as, Xamarin, Flutter, React native, etc.). Key components of the universal mobile application (such as, the universal integration device 300) are the UI management module 302, the connector module 308, the device manager 306, the universal app manager 304, and the platform components and device sensors 310. The key components communicate with each other as per a defined LWDCP protocol. The OEM may select a design pattern and use case flows based on vertical and sensors for the IoT device.

Further, the process 1500 includes enabling universal app manager to act as IoT gateway by eliminating the physical IoT gateway for IoT device onboarding, at step 1508. An additional component, the IoT gateway application (for example, the IoT gateway application 1302) may be added to universal integration device. The IoT gateway application 1302 may implement IoT gateway-related use cases such as, FOTA 1314 (updates module to ensure that the IoT gateway application software and sensors are updated with latest versions of security patches, OS, and the like), sensors management module 1316 (manages different types of sensor devices and properties, configurations and access controls for IOT sensors), and device analytics module 1318 (additionally built to manage behavior of the end user as well as the IoT device). The data may be secure with universal mobile application security 1320. For additional security of sensitive data, the OEM may use any encryption mechanism.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 16:
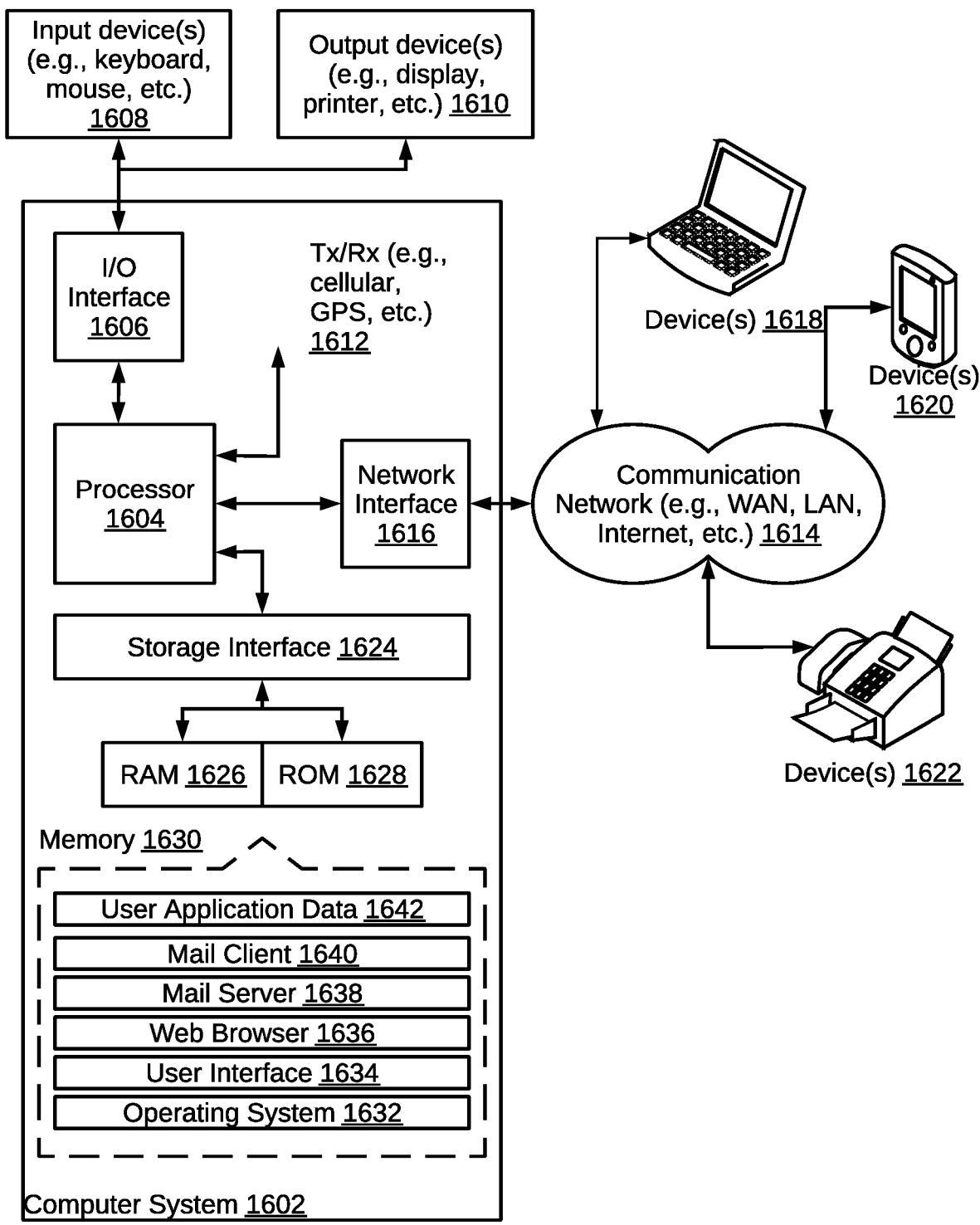
FIG. 16 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 16, a block diagram of an exemplary computer system 1602 for implementing embodiments consistent with the present disclosure is illustrated. Variations of computer system 1602 may be used for implementing system 100 for building an ensemble model. Computer system 1602 may include a central processing unit ("CPU" or "processor") 1604. Processor 1604 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 1604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1604 may be disposed in communication with one or more input/output (I/O) devices via I/O interface 1606. The I/O interface 1606 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 1606, the computer system 1602 may communicate with one or more I/O devices. For example, the input device 1608 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 1610 may be a printer, fax machine, video display (e.g., cathode ray tube (CRT), liquid crystal display (LCD), light-emitting diode (LED), plasma, or the like), audio speaker, etc. In some embodiments, a transceiver 1612 may be disposed in connection with the processor 1604. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM45501UB8®, INFINEON TECHNOLOGIES® X-GOLD 1436-PMB9800® transceiver, or the like), providing IEEE 802.11 a/b/g/n, Bluetooth, FM, global positioning system (GPS), 2G/3G HSDPA/HSUPA communications, etc.

In some embodiments, the processor 1604 may be disposed in communication with a communication network 1616 via a network interface 1614. The network interface 1614 may communicate with the communication network 1616. The network interface may employ connection protocols including, without limitation, direct connect, Ethernet (e.g., twisted pair 10/100/1000 Base T), transmission control protocol/internet protocol (TCP/IP), token ring, IEEE 802.11 a/b/g/n/x, etc. The communication network 1616 may include, without limitation, a direct interconnection, local area network (LAN), wide area network (WAN), wireless network (e.g., using Wireless Application Protocol), the Internet, etc. Using the network interface 1614 and the communication network 1616, the computer system 1602 may communicate with devices 1618, 1620, and 1622. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 1602 may itself embody one or more of these devices.

In some embodiments, the processor 1604 may be disposed in communication with one or more memory devices 1630 (e.g., RAM 1626, ROM 1628, etc.) via a storage interface 1624. The storage interface may connect to memory devices 1630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, 12C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 1630 may store a collection of program or database components, including, without limitation, an operating system 1632, user interface application 1634, web browser 1636, mail server 1638, mail client 1640, user/application data 1642 (e.g., any data variables or data records discussed in this disclosure), etc. The operating system 1632 may facilitate resource management and operation of the computer system 1602. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 1634 may facilitate display, execution, interaction, manipulation, or operation of program components through textual or graphical facilities. For example, user interfaces may provide computer interaction interface elements on a display system operatively connected to the computer system 1602, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 1602 may implement a web browser 1636 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 1602 may implement a mail server 1638 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 1602 may implement a mail client 1640 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 1602 may store user/application data 1642, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the disclosed method and system try to overcome the technical problem of managing IoT devices in heterogeneous communication networks. The method and system provide for a universal mobile application accessible through a universal integration device. The universal mobile application may be used to control IOT devices from any OEM. The universal mobile application supports all standard IoT device communication protocols such as, BT®, Wi-Fi, RFID, NFC, etc. Additionally, the universal mobile application is flexible to comply with existing standards from Apple®, Google®, etc. Further, the universal mobile application is easy to maintain, upgrade and enhance. Further, the method and system provide for an IoT gateway application to provide a robust platform, significant storage and data processing capabilities, built-in communication protocols, and secure sandbox architecture.

Specifically, the claimed limitations of the present disclosure address the technical challenge by receiving metadata corresponding to each of a set of IoT devices including a plurality of IoT sensors, validating each of the set of IoT devices based on the received metadata, establishing communication with each of the set of IoT devices through an associated predefined data communication protocol, receiving real-time data from each of the plurality of sensors associated with each of the set of IoT devices through an IoT protocol, monitoring the real-time data received from each of the plurality of sensors at predefined time intervals through a GUI, and managing one or more device parameters corresponding to each of the set of IoT devices in the heterogeneous communication network through the GUI based on the real-time data.

As will be appreciated by those skilled in the art, the techniques described in the various embodiments discussed above are not routine, or conventional, or well understood in the art. The techniques discussed above provide for managing IoT devices in heterogeneous communication networks. The techniques first receive metadata corresponding to each of a set of IoT devices. The techniques may then validate each of the set of IoT devices based on the received metadata. The techniques may then establish communication with each of the set of IoT devices through an associated predefined data communication protocol. The techniques may then receive real-time data from each of the plurality of sensors associated with each of the set of IoT devices through an IoT protocol. The techniques may then monitor the real-time data received from each of the plurality of sensors at predefined time intervals through a GUI. The techniques may then manage one or more device parameters corresponding to each of the set of IoT devices in the heterogeneous communication network through the GUI based on the real-time data.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for managing IoT devices in heterogeneous communication networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for managing Internet of Things (IoT) devices in heterogeneous communication networks, the method comprising:
   receiving, by a universal integration device, metadata corresponding to each of a set of IoT devices, wherein a plurality of IoT sensors is associated with each of the set of IoT devices, and wherein the metadata comprises configuration parameters corresponding to each of the plurality of IoT sensors;
validating, by the universal integration device, each of the set of IoT devices based on the received metadata;
upon successfully validating, establishing, by the universal integration device, communication with each of the set of IoT devices through an associated predefined data communication protocol, wherein the set of IoT devices is a part of a heterogeneous communication network;
receiving, by the universal integration device, real-time data from each of the plurality of sensors associated with each of the set of IoT devices through an IoT protocol, wherein the IoT protocol is a Lightweight Device Control Protocol (LWDCP);
monitoring, by the universal integration device, the real-time data received from each of the plurality of sensors at predefined time intervals through a Graphical User Interface (GUI); and
managing, by the universal integration device, one or more device parameters corresponding to each of the set of IoT devices in the heterogeneous communication network through the GUI based on the real-time data, wherein the one or more device parameters comprise device properties, device configuration, device access controls, and the configuration parameters corresponding to each of the plurality of IoT sensors.

2. The method of claim 1, wherein managing the one or more device parameters of each of the set of IoT devices further comprises:
receiving a user command corresponding to one or more device parameters of an IoT device from the set of IoT devices through the GUI; and
dynamically modifying each of the one or more device parameters of the IoT device based on the user command.

3. The method of claim 1, further comprising:
establishing a communication between each of the set of IoT devices and an IoT cloud server through an IoT gateway application;
preprocessing the real-time data of each of the plurality of sensors associated with each of the set of IoT devices;
transmitting the preprocessed real-time data of each of the plurality of sensors to the IoT cloud server through an IoT gateway application; and
monitoring the real-time data received from each of the plurality of sensors through the IoT cloud server at predefined time intervals.

4. The method of claim 3, further comprising updating at least one of security patches and Operating Systems (OS) corresponding to the IoT gateway application and each of the plurality of sensors through Firmware over the Air (FOTA).

5. The method of claim 1, wherein validating each of the set of IoT devices comprises:
identifying the associated predefined communication protocol of an IoT device based on the metadata corresponding to the IoT device; and
determining compatibility of the associated predefined communication protocol of the IoT device with a plurality of supported communication protocols.

6. The method of claim 1, further comprising:
generating an error code and an associated error message in response to a failed validation of an IoT device;
displaying the error code and the associated error message on the GUI; and
displaying a solution to resolve the failed validation of the IoT device on the GUI.

7. The method of claim 1, further comprising securing the established communication with each of the plurality of IoT sensors through a unique authentication token.

8. The method of claim 1, further comprising deregistering one or more of the set of IoT devices based on a user command.

9. The method of claim 1, wherein receiving metadata corresponding to each of the set of IoT devices comprises receiving the metadata through at least one of a Quick Response (QR) code associated with the IoT device, a server, and a communicatively coupled local machine.

10. A system for managing Internet of Things (IoT) devices in heterogeneous communication networks, the system comprising:
a processor; and
a computer-readable medium communicatively coupled to the processor, wherein the computer-readable medium stores processor-executable instructions, which when executed by the processor, cause the processor to:
receive metadata corresponding to each of a set of IoT devices, wherein a plurality of IoT sensors is associated with each of the set of IoT devices, and wherein the metadata comprises configuration parameters corresponding to each of the plurality of IoT sensors;
validate each of the set of IoT devices based on the received metadata;
upon successfully validating, establish communication with each of the set of IoT devices through an associated predefined data communication protocol, wherein the set of IoT devices is a part of a heterogeneous communication network;
receive real-time data from each of the plurality of sensors associated with each of the set of IoT devices through an IoT protocol, wherein the IoT protocol is a Lightweight Device Control Protocol (LWDCP);
monitor the real-time data received from each of the plurality of sensors at predefined time intervals through a Graphical User Interface (GUI); and
manage one or more device parameters corresponding to each of the set of IoT devices in the heterogeneous communication network through the GUI based on the real-time data, wherein the one or more device parameters comprise device properties, device configuration, device access controls, and the configuration parameters corresponding to each of the plurality of IoT sensors.

11. The system of claim 10, wherein to manage the one or more device parameters of each of the set of IoT devices, the processor-executable instructions, on execution, further cause the processor to:
receive a user command corresponding to one or more device parameters of an IoT device from the set of IoT devices through the GUI; and
dynamically modify each of the one or more device parameters of the IoT device based on the user command.

12. The system of claim 10, wherein, the processor-executable instructions, on execution, further cause the processor to:
establish a communication between each of the set of IoT devices and an IoT cloud server through an IoT gateway application;

preprocess the real-time data of each of the plurality of sensors associated with each of the set of IoT devices;

transmit the preprocessed real-time data of each of the plurality of sensors to the IoT cloud server through an IoT gateway application; and monitor the real-time data received from each of the plurality of sensors through the IoT cloud server at predefined time intervals.

13. The system of claim 12, wherein, the processor-executable instructions, on execution, further cause the processor to update at least one of security patches and Operating Systems (OS) corresponding to the IoT gateway application and each of the plurality of sensors through Firmware over the Air (FOTA).

14. The system of claim 10, wherein to validate each of the set of IoT devices, the processor-executable instructions, on execution, cause the processor to:

identify the associated predefined communication protocol of an IoT device based on the metadata corresponding to the IoT device; and determine compatibility of the associated predefined communication protocol of the IoT device with a plurality of supported communication protocols.

15. The system of claim 10, wherein, the processor-executable instructions, on execution, further cause the processor to:

generate an error code and an associated error message in response to a failed validation of an IoT device;

display the error code and the associated error message on the GUI; and display a solution to resolve the failed validation of the IoT device on the GUI.

16. The system of claim 10, wherein, the processor-executable instructions, on execution, further cause the processor to secure the established communication with each of the plurality of IoT sensors through a unique authentication token.

17. The system of claim 10, wherein, the processor-executable instructions, on execution, further cause the processor to deregister one or more of the set of IoT devices based on a user command.

18. The system of claim 10, wherein to receive metadata corresponding to each of the set of IoT devices, the processor-executable instructions, on execution, cause the processor to receive the metadata through at least one of a Quick Response (QR) code associated with the IoT device, a server, and a communicatively coupled local machine.

19. A non-transitory computer-readable medium storing computer-executable instructions for managing Internet of Things (IoT) devices in heterogeneous communication networks, the computer-executable instructions configured for:

receiving metadata corresponding to each of a set of IoT devices, wherein a plurality of IoT sensors is associated with each of the set of IoT devices, and wherein the metadata comprises configuration parameters corresponding to each of the plurality of IoT sensors;

validating each of the set of IoT devices based on the received metadata;

upon successfully validating, establishing communication with each of the set of IoT devices through an associated predefined data communication protocol, wherein the set of IoT devices is a part of a heterogeneous communication network;

receiving real-time data from each of the plurality of sensors associated with each of the set of IoT devices through an IoT protocol, wherein the IoT protocol is a Lightweight Device Control Protocol (LWDCP);

monitoring the real-time data received from each of the plurality of sensors at predefined time intervals through a Graphical User Interface (GUI); and managing one or more device parameters corresponding to each of the set of IoT devices in the heterogeneous communication network through the GUI based on the real-time data, wherein the one or more device parameters comprise device properties, device configuration, device access controls, and the configuration parameters corresponding to each of the plurality of IoT sensors.

20. The non-transitory computer-readable medium of claim 19, wherein the computer-executable instructions are further configured for:

establishing a communication between each of the set of IoT devices and an IoT cloud server through an IoT gateway application;

preprocessing the real-time data of each of the plurality of sensors associated with each of the set of IoT devices;

transmitting the preprocessed real-time data of each of the plurality of sensors to the IoT cloud server through an IoT gateway application; and monitoring the real-time data received from each of the plurality of sensors through the IoT cloud server at predefined time intervals.

* * * * *